US009788237B2

(12) United States Patent
Catovic et al.

(10) Patent No.: US 9,788,237 B2
(45) Date of Patent: Oct. 10, 2017

(54) HANDLING OF WLAN OFFLOADABILITY INDICATION

(71) Applicant: QUALCOMM Incorporated, San Diego, CA (US)

(72) Inventors: Amer Catovic, Carlsbad, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/835,473

(22) Filed: Aug. 25, 2015

(65) Prior Publication Data

US 2016/0135089 A1    May 12, 2016

Related U.S. Application Data

(60) Provisional application No. 62/077,174, filed on Nov. 7, 2014.

(51) Int. Cl.
*H04W 28/08* (2009.01)
*H04W 36/22* (2009.01)
(Continued)

(52) U.S. Cl.
CPC ..... *H04W 28/085* (2013.01); *H04W 36/0055* (2013.01); *H04W 36/22* (2013.01);
(Continued)

(58) Field of Classification Search
CPC ............. H04W 36/00; H04W 36/0072; H04W 36/0077; H04W 36/16; H04W 36/18;
(Continued)

(56) References Cited

U.S. PATENT DOCUMENTS

2014/0064068 A1   3/2014  Horn et al.
2014/0204909 A1*  7/2014  Cheng ................... H04W 8/082
                                                              370/331
(Continued)

FOREIGN PATENT DOCUMENTS

EP            2709418 A2      3/2014
WO         2013042330 A1      3/2013
(Continued)

OTHER PUBLICATIONS

3rd Generation Partnership Project; Technical Specification Group Services and System Aspects; General Packet Radio Service (GPRS); Service Description; Stage 2, Release 13, 3GPP Standard; 3GPP TS 23.060, 3rd Generation Partnership Project (3GPP), Mobile Competence Centre; 650, Route Des Lucioles; F-06921 Sophia-Antipolis Cedex; France, vol. SA WG2, No. vol. 13.3.3. Sep. 17, 2014, pp. 1-350, XP050925457 [retrieved on Sep. 17, 2014], Sep. 2014.
(Continued)

*Primary Examiner* — Benjamin H Elliott, IV
(74) *Attorney, Agent, or Firm* — Arent Fox, LLP

(57) ABSTRACT

A method of wireless communication by a UE includes receiving an indication information; determining, based on the indication information, whether a connection of the UE is authorized to be offloaded from a first channel to a second channel; determining, when the connection is not authorized to be offloaded, whether there is an ongoing handover procedure to offload the connection of the UE from the first channel to the second channel or whether the indication information is received in a message corresponding to a request to deactivate a default evolved packet system (EPS) bearer of the connection of the UE. The method further includes disregarding the indication information when the connection is not authorized to be offloaded and it is determined that either there is an ongoing handover proce-
(Continued)

dure to offload the connection of the UE from the first channel to the second channel or the message corresponds to a request to deactivate a default EPS bearer of the connection.

38 Claims, 17 Drawing Sheets

(51) Int. Cl.
| | | |
|---|---|---|
| *H04W 36/24* | (2009.01) | |
| *H04W 36/00* | (2009.01) | |
| *H04W 36/14* | (2009.01) | |
| *H04W 84/12* | (2009.01) | |
| *H04W 88/02* | (2009.01) | |

(52) U.S. Cl.
CPC .......... *H04W 36/245* (2013.01); *H04W 36/14* (2013.01); *H04W 36/24* (2013.01); *H04W 84/12* (2013.01); *H04W 88/02* (2013.01)

(58) Field of Classification Search
CPC ... H04W 36/34; H04W 28/08; H04W 28/085; H04W 28/0289
See application file for complete search history.

(56) References Cited

U.S. PATENT DOCUMENTS

| | | | | |
|---|---|---|---|---|
| 2014/0241264 A1* | 8/2014 | Liu | ..................... | H04W 76/062 370/329 |
| 2015/0181504 A1* | 6/2015 | Tsai | ..................... | H04W 36/22 370/331 |
| 2015/0327110 A1* | 11/2015 | Jeong | ..................... | H04W 48/20 370/338 |
| 2015/0334622 A1* | 11/2015 | Baboescu | ............. | H04W 36/14 370/331 |
| 2016/0021570 A1* | 1/2016 | Sirotkin | ................ | H04W 28/08 370/235 |
| 2016/0135086 A1* | 5/2016 | Yang | ..................... | H04L 1/0011 370/343 |

FOREIGN PATENT DOCUMENTS

| | | |
|---|---|---|
| WO | 2014165832 A1 | 10/2014 |
| WO | 2014175677 A1 | 10/2014 |

OTHER PUBLICATIONS

Catt: "Discussion of Update of WLAN Offloadability Indication," 3GPP Draft; S2-142589, 3rd Generation Partnership Project (3GPP), Mobile Competence Centre; 650, Route Des Lucioles; F-06921 Sophia-Antipolis Cedex; France, vol. SA WG2, No. Dublin, Ireland; Jul. 7, 2014-Jul. 11, 2014, Jul. 2, 2014, XP050837021, Retrieved from the Internet URL: http;//www.3GPP.org/ftp/tsg__SA/WG2__ARCH/TSGC2__104__Dublin/docs/, Retrieved on Jul. 2, 2014, the whole document.

Ericsson: "Updating WLAN Offloadability Indication to the UE in Solution Witho," 3GPP Draft; S2-142531__DP__WLAN__OF-FLOADABILITY__UPDATE, 3rd Generation Partnership Project (3GPP), Mobile Competence Centre; 650, Route Des Lucioles; F-06921 Sophia-Antipolis Cedex; France, vol. SA WG2, No. Dublin, Ireland; Jul. 7, 2014-Jul. 11, 2014, Jul. 2, 2014 (Jul. 2, 2014), XP050836962, Retrieved from the Internet URL: http://www.3gpp.org/ftp/tsg__sa/WG2__Arch/TSGS2__104 Dublin/Docs/ [retrieved on Jul. 2, 2014] the whole document.

Huawei, et al., "Add WLAN Offload Indication to NAS," 3GPP Draft; C1-144941 Add WLAN Offload Indication to NAS 24301, 3rd Generation Partnership Project (3GPP), Mobile Competence Centre; 650, Route Des Lucioles; F-06921 Sophia-Antipolis Cedex; France, vol. CT WG1, No. San Francisco (CA), USA; Nov. 17, 2014-Nov. 21, 2014, Nov. 22, 2014, XP050917528, Retrieved from the Internet URL: http://www.3GPP.org/ftp/tsg__CT/WG1__MM-CC-SM__EX-C-N-1/TSGC1__89__SanFrancisco/docs/ [Retrieved from the Internet Nov. 22, 2104].

International Search Report and Written Opinion—PCT/US2015/055367—ISA/EPO—dated Apr. 26, 2016.

LTE: General Packet Radio Service (GPRS) Enhancements for Evolved Universal Terrestrial Radio Access Network (E-UTRAN) Access, 3GPP TS 23.401 Version 12.6.0, Release 12, Technical Specification, European Telecommunications Standards Institute (ETSI), 650, Route Des Lucioles; F-06921, Sep. 2014.

Motorola Mobility: "Alternative RAN Solutions without ANDSF for Traffic Routing," 3GPP Draft, S2-141080__DISC__RAN__AL-TERNATIVES, 3rd Generation Partnership Project (3GPP), Mobile Competence Centre; 650, Route Des Lucioles; F-06921 Sophia-Antipolis Cedex; France, vol. SA WG2, No. Malta; Mar. 24, 2014-Mar. 28, 2014, Mar. 23, 2014, XP050804564, Retrieved from the Internet URL: http://www.3gpp.org/ftp/Meetings__3GPP__SYNC/SA2/Docs/ [retrieved on Mar. 23, 2014], the whole document.

* cited by examiner

HANDLING OF WLAN OFFLOADABILITY INDICATION

CROSS-REFERENCE TO RELATED APPLICATION

This application claims the benefit of U.S. Provisional Application Ser. No. 62/077,174, entitled "OPTIMIZING HANDLING OF WLAN OFFLOADABILITY INDICATION" and filed on Nov. 7, 2014 which is expressly incorporated by reference herein in its entirety.

BACKGROUND

Field

The present disclosure relates generally to communication systems, and more particularly, to a method and apparatus for handling an WLAN offloadability indication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A user equipment (UE) may have both 3GPP and wide local area network (WLAN) capabilities. That is, a UE may communicate with a core network of the wireless communication by communicating through a base station, such as an evolved Node B (eNB), or by communicating through a WLAN router. The connection between the UE and the core network by which the UE and the core network communicate with each other may be referred to as a Packet Data Network (PDN) connection.

The PDN connection between the UE and the core network may be handed over from the base station to the WLAN router under certain conditions and according to a "WLAN offloadability indication." However, certain system errors and inefficiencies may arise when the WLAN offloadability indication changes while the UE is in the midst of a handover process, or when an updated WLAN offloadability indication is to be sent to the UE when the PDN connection is to be deactivated.

Accordingly, there is a need for an improved method of handling the various scenarios described herein to reduce system errors and inefficiencies.

SUMMARY

In an aspect of the disclosure, a method, a computer program product, and an apparatus are provided. The apparatus may be a wireless communication user equipment (UE). The receives an indication information; determines, based on the indication information, whether a connection of the UE is authorized to be offloaded from a first channel to a second channel, or not authorized to be offloaded from the first channel to the second channel; determines, when the connection is not authorized to be offloaded, whether there is an ongoing handover procedure to offload the connection of the UE from the first channel to the second channel; and disregards the indication information when the connection is not authorized to be offloaded and it is determined that there is an ongoing handover procedure to offload the connection of the UE from the first channel to the second channel.

In an aspect of the disclosure, a method, a computer program product, and an apparatus are provided. The apparatus may be a wireless communication user equipment (UE). The apparatus participates in a handover procedure for switching a connection of the UE from a first channel to a second channel different from the first channel. The apparatus receives indication information indicating that the connection of the UE is unauthorized to be offloaded from the first channel to the second channel. The apparatus disregards the indication information. The apparatus continues the handover procedure upon disregarding the indication information.

In an aspect of the disclosure, a method, a computer program product, and an apparatus are provided. The apparatus may be a mobility management entity (MME). The MME receives indication information indicating whether a connection of a UE is authorized to be offloaded from a first channel to a second channel. The MME receives a message associated with the UE. The MME determines whether the message corresponds to a request to deactivate a default evolved packet system (EPS) bearer of the connection of the UE. The MME refrains from placing the indication information in the message when the message corresponds to a request to deactivate the default EPS bearer of the connection. The MME sends the message to the UE.

In an aspect of the disclosure, a method, a computer program product, and an apparatus are provided. The apparatus may be a wireless communication user equipment (UE). The apparatus receives a message containing indication information indicating whether a connection of the UE is authorized to be offloaded from a first channel to a second channel. The apparatus determines whether the message corresponds to a request to deactivate a default evolved packet system (EPS) bearer of the connection of the UE. The apparatus disregards the indication information when the message corresponds to a request to deactivate a default EPS bearer of the connection.

In an aspect of the disclosure, a method, a computer program product, and an apparatus are provided. The apparatus may be a wireless communication user equipment (UE). The apparatus receives a message containing indication information indicating whether a connection of the UE is authorized to be offloaded from a first channel to a second channel. The apparatus determines whether the indication information indicates that the connection of the UE is authorized to be offloaded from the first channel to the second channel. The apparatus initiates a handover procedure to offload the connection of the UE from the first channel to the second channel when the indication information indicates that the connection of the UE is authorized to be offloaded from a first channel to a second channel.

DETAILED DESCRIPTION

Figure 1:
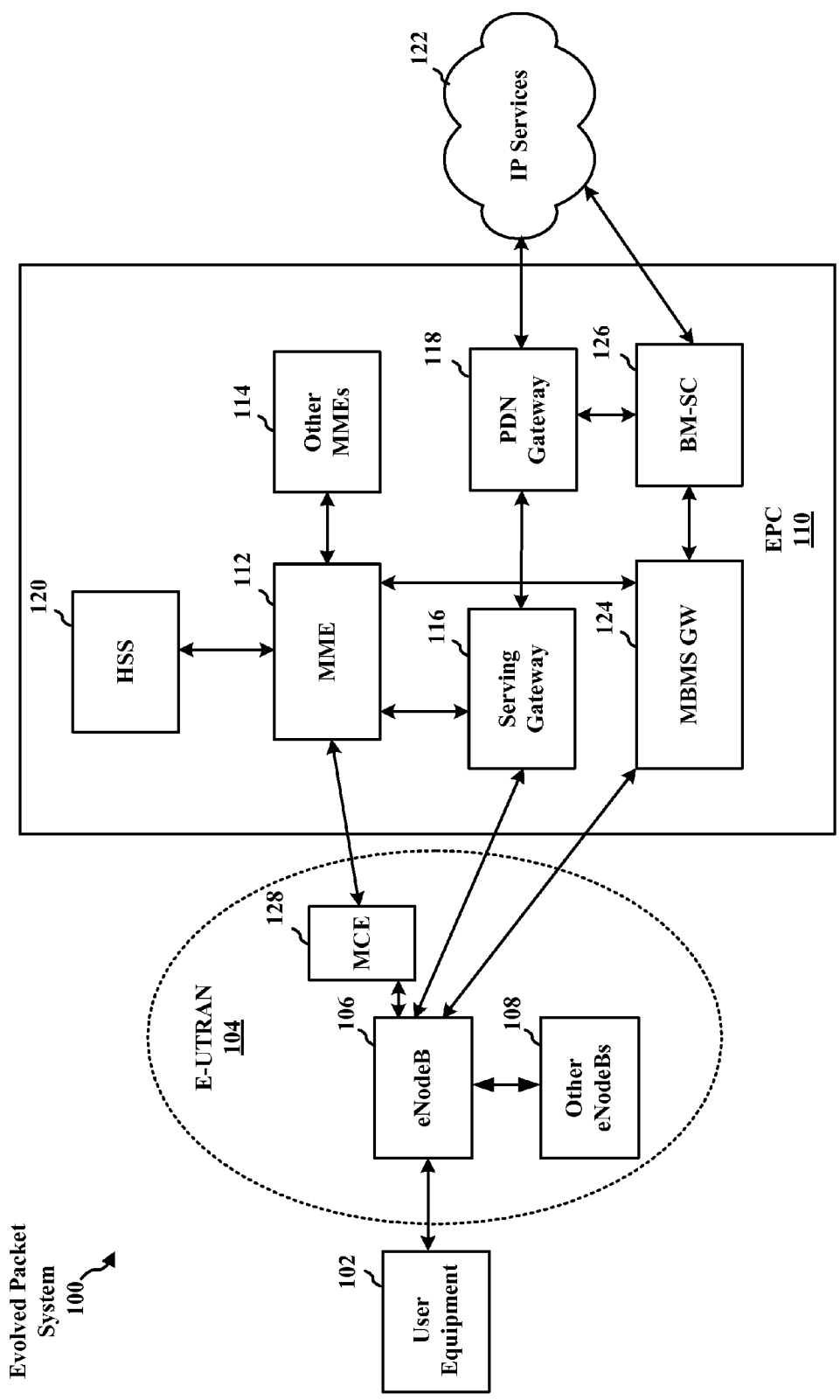
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer/bearer context and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services.

Figure 2:
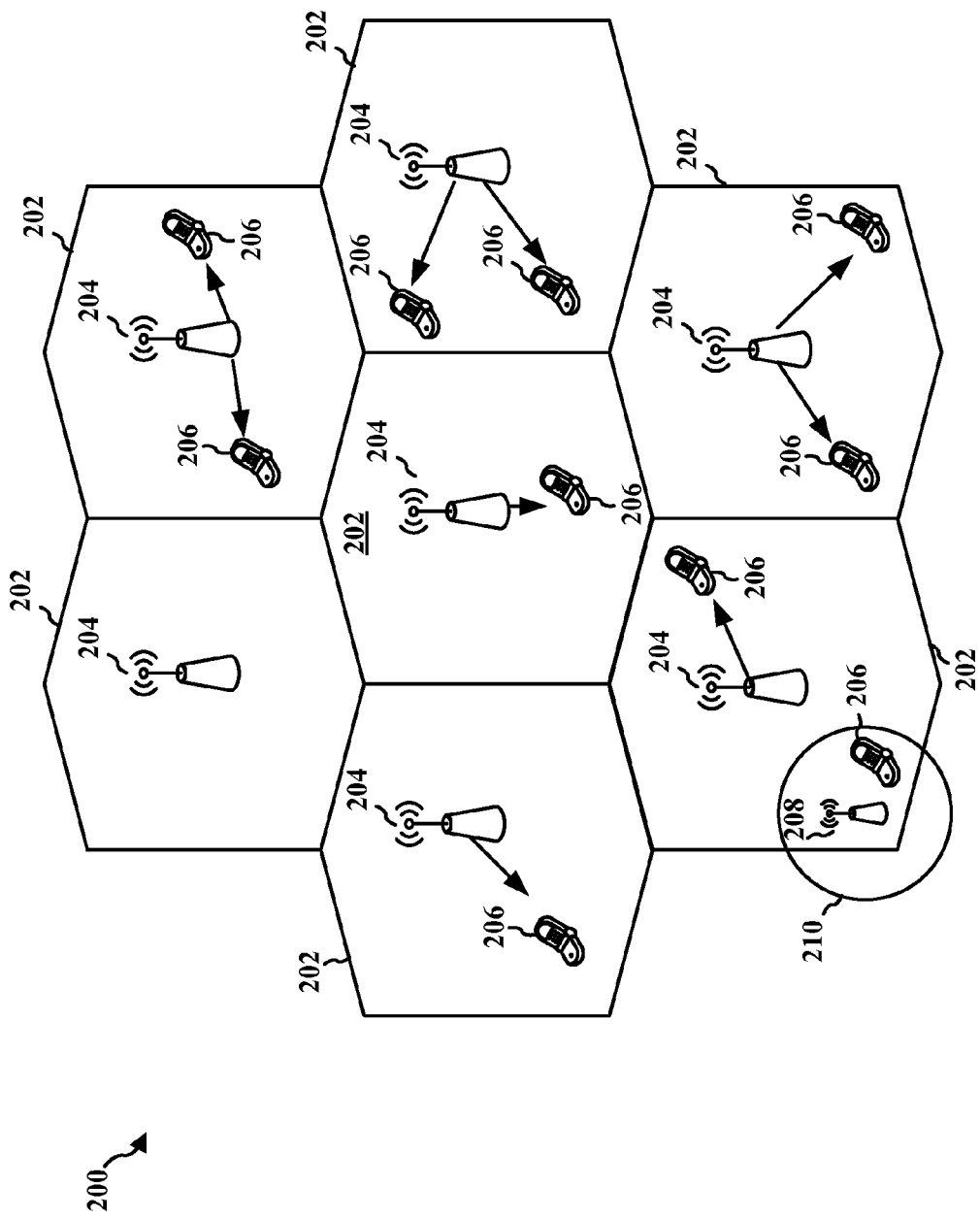
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
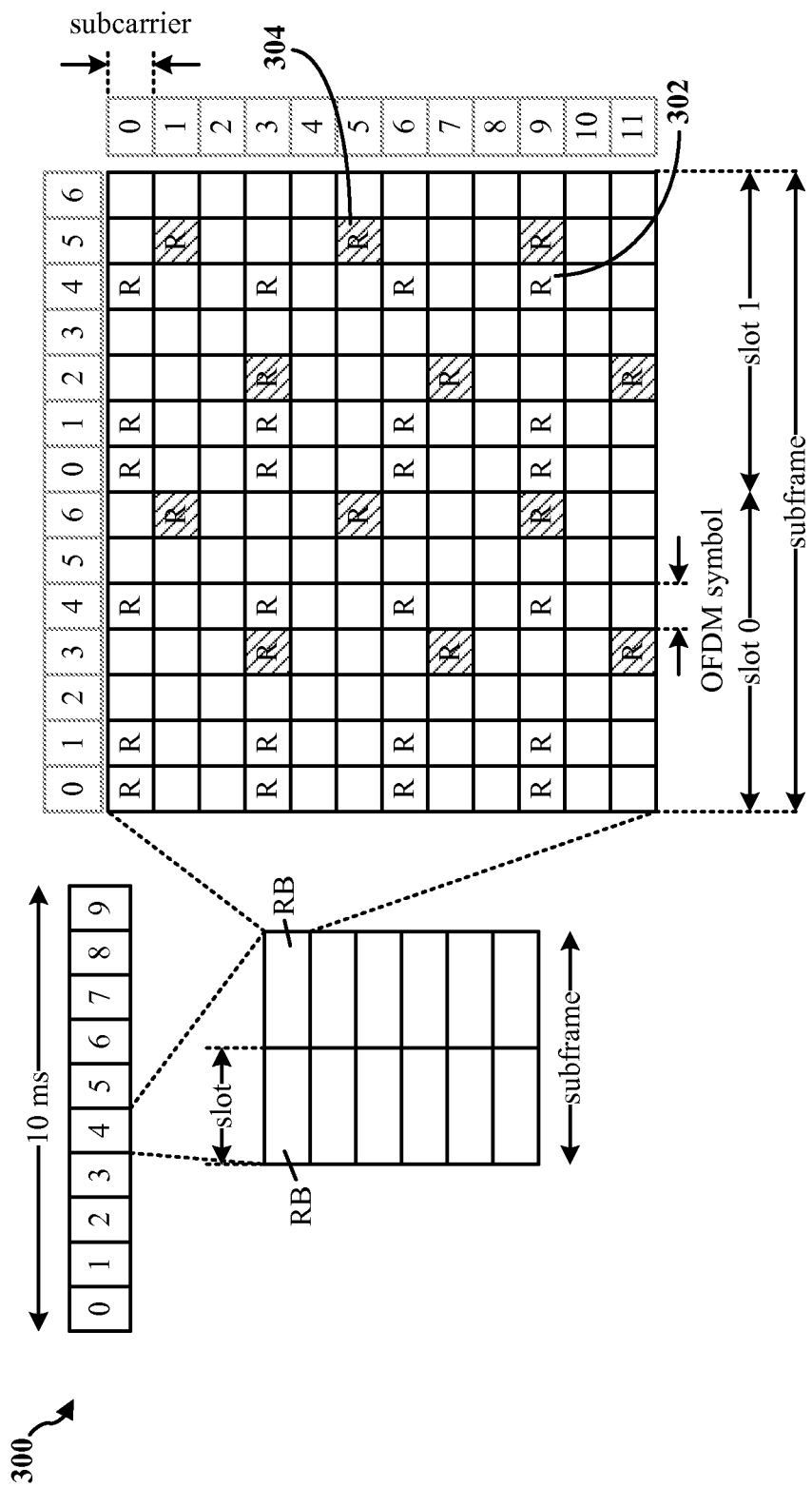
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
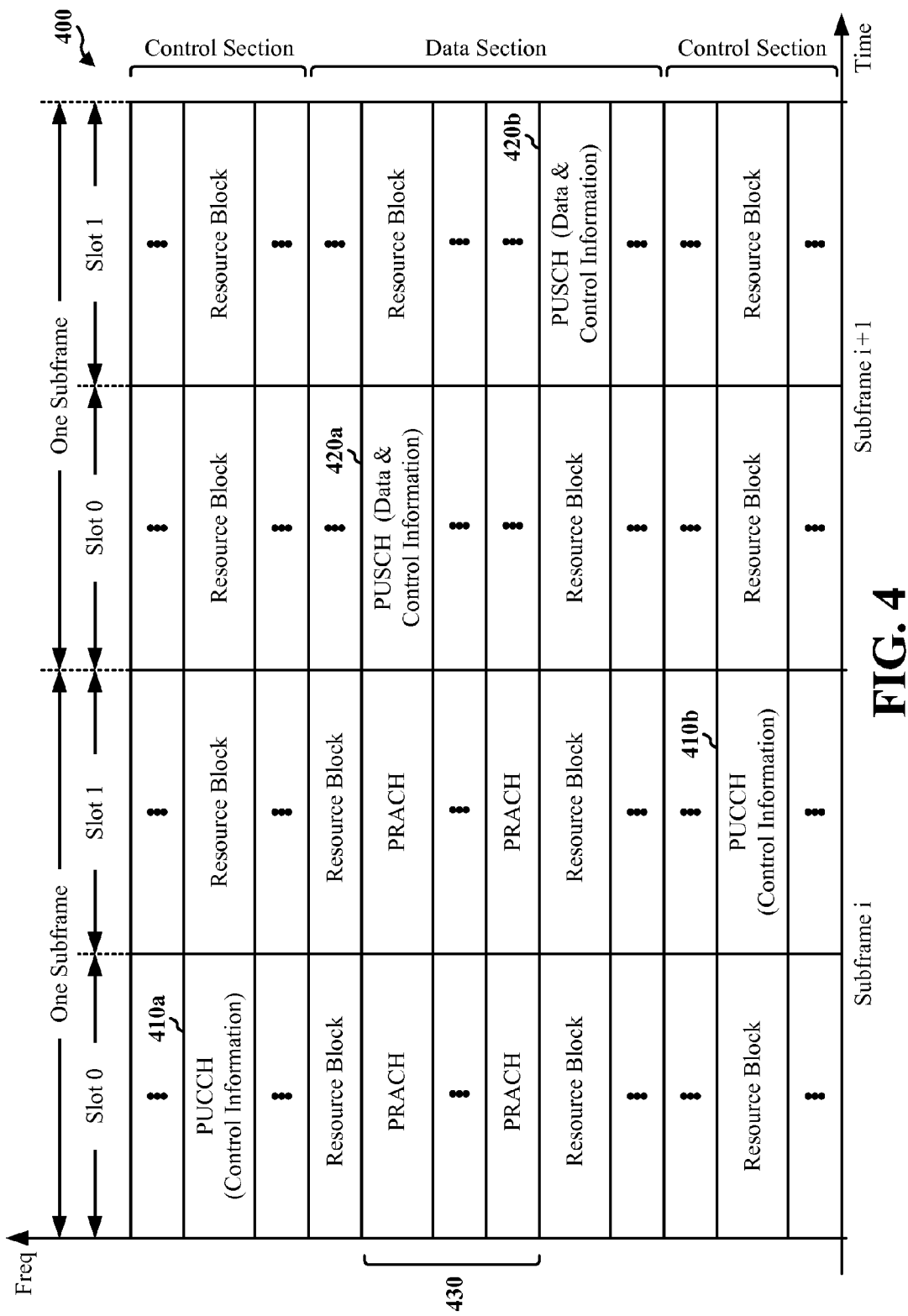
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
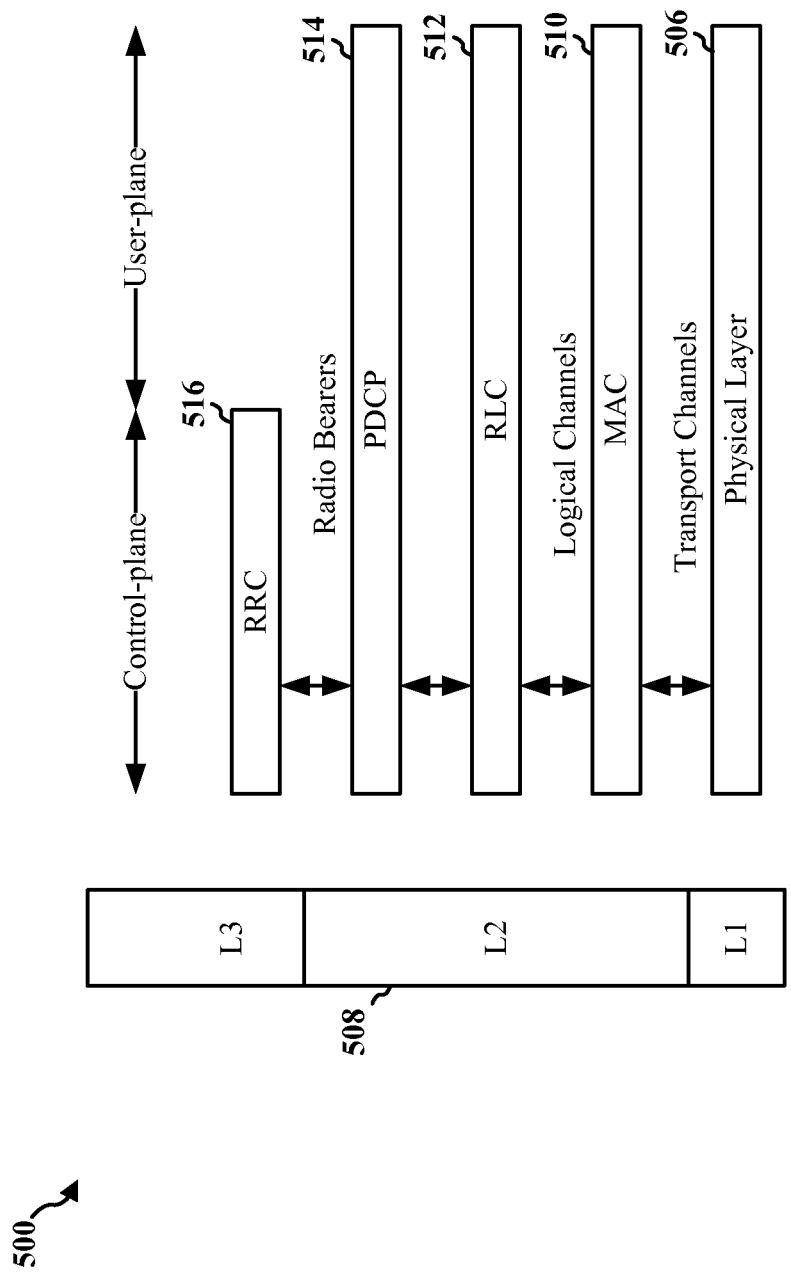
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers/bearer contexts and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
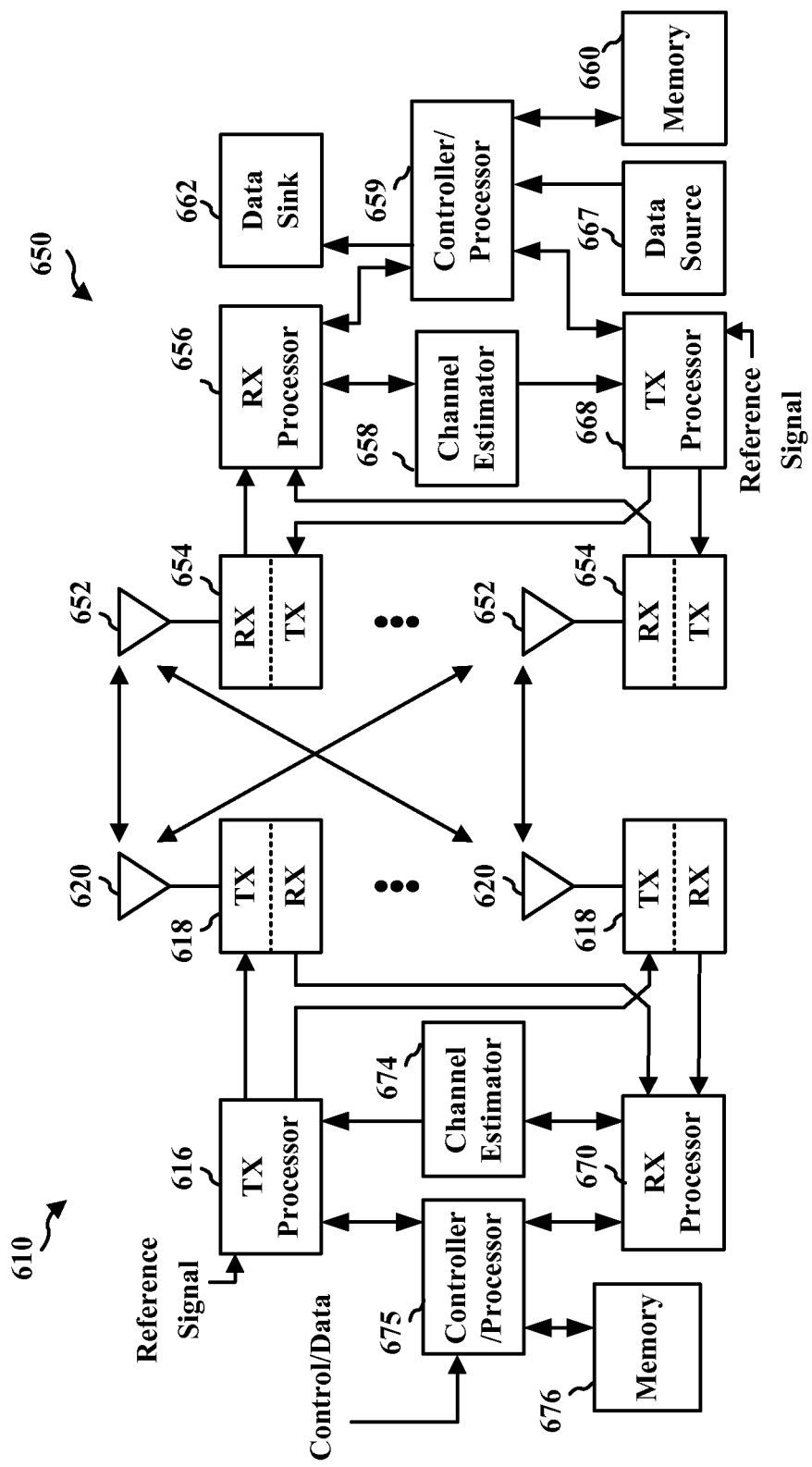
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer.

Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
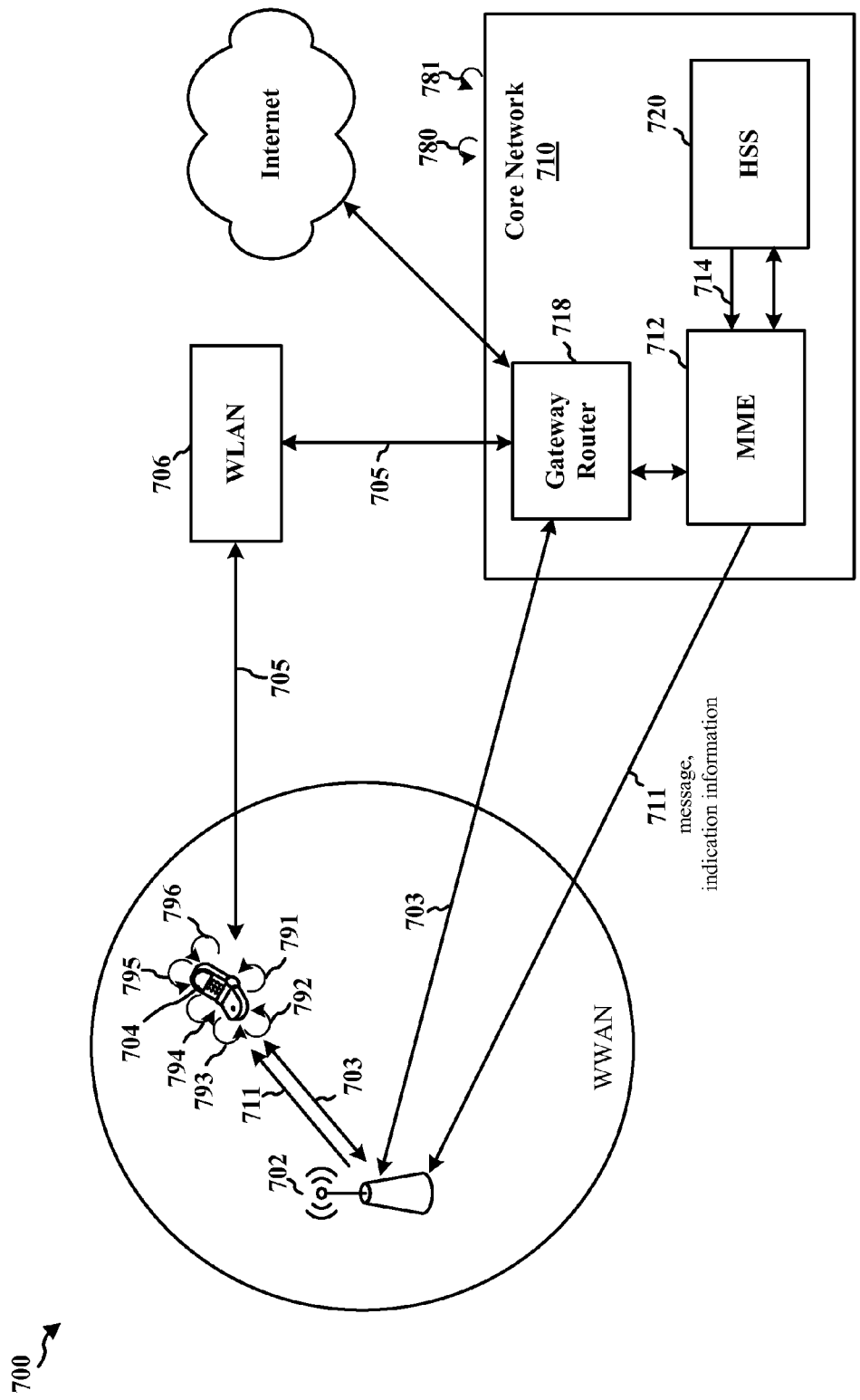
FIG. 7A is a diagram illustrating an example of a user equipment and first and second channels for connecting with a core network through either of a WWAN or a WLAN.
Figure 7B:
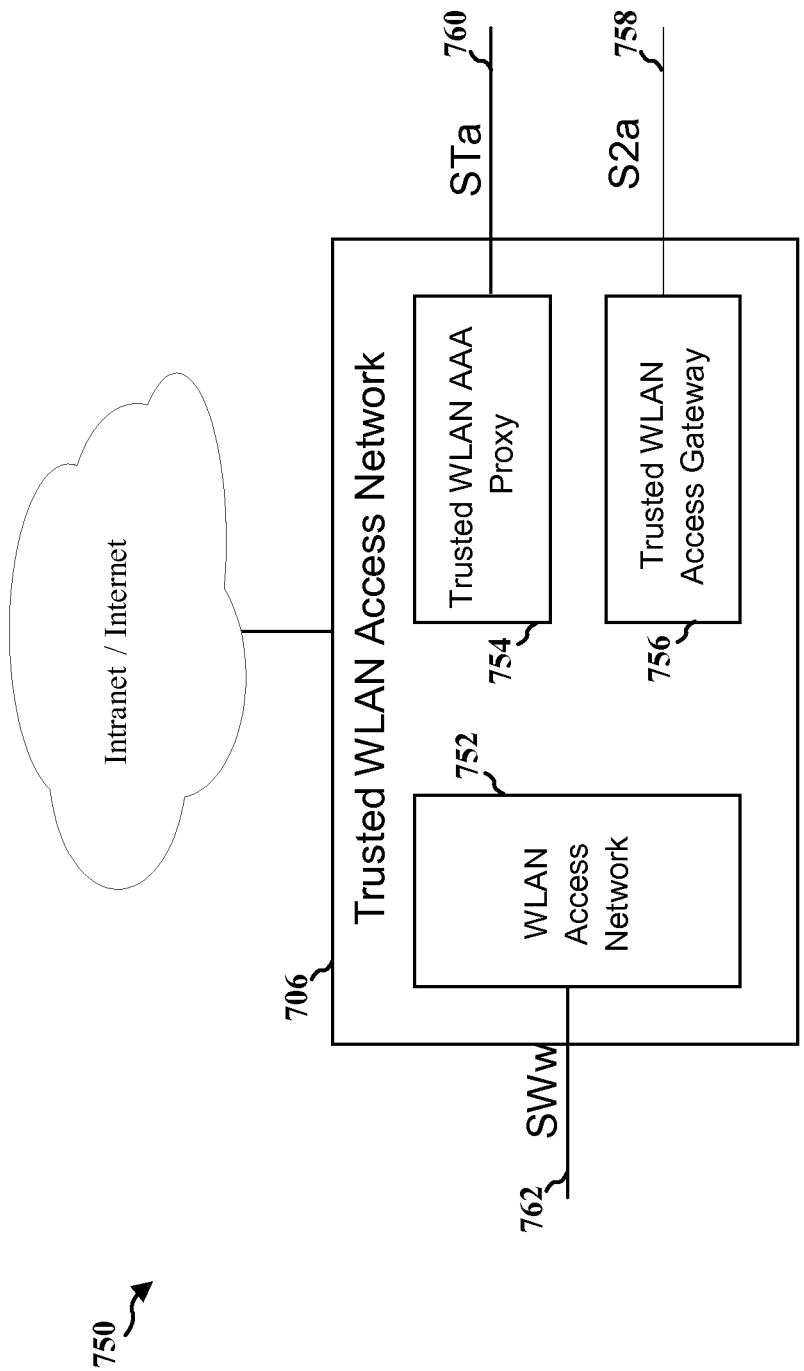
FIG. 7B is a diagram illustrating an example WLAN for connecting with a core network.

FIG. 7A is a diagram 700 illustrating an example of a user equipment 704 and a first channel 703 and a second channel 705 for connecting with a core network 710 (e.g., EPC 110 in FIG. 1). The connection between the UE 704 and the core network 710 may be through an eNB/base station 702 or through a WLAN 706. FIG. 7B is a diagram 750 illustrating an example configuration of the WLAN 706 of FIG. 7A. The WLAN 706 includes a WLAN access network 752, a WLAN AAA proxy 754, and a WLAN access gateway 756. The S2a line 758 connects to the gateway router 718 of FIG. 7A. The STa line 760 connects to the HSS 720 of FIG. 7A, and the SWw line 762 connects to the UE 704.

The UE 704 may be connected to the network 710 by a PDN connection (e.g., via the first channel 703 or via the second channel 705, and via Serving Gateway 116 and the PDN Gateway 118 in FIG. 1). The PDN connection is associated with a given Access Point Name (APN) at a gateway router 718 in the core network 710, and is associated with an IP address assigned to the UE 704. The PDN connection contains one or more bearers, with at least one of the bearers being referred to as a default bearer. The PDN connection may also have one or more dedicated bearers, which are activated using a dedicated bearer activation procedure. Each of the bearers of the PDN connection carries traffic flows associated with one quality of service class. Accordingly, when setting up a PDN connection between the UE 704 and the core network 710, the act of establishing a PDN connection automatically activates the default bearer, and conversely, deactivating the default bearer causes the PDN connection between the UE 704 and the core network 710 to be released.

The PDN connection between the UE 704 and the core network 710 may be handed over from the eNB/base station 702 to the WLAN router 706 under certain conditions, and if the PDN connection is indicated as being "offloadable" by a "WLAN offloadability indication" (i.e., indication information). There might be only one PDN connection between the UE 704 and the core network 710, or the UE 704 may have multiple PDN connections with the core network 710. By being indicated as offloadable, the PDN connection is indicated as being a connection that is configured to be switched from the eNB/base station 702 to the WLAN router 706 (e.g., without a drop in service, or without a discontinuity in connectivity between the UE 704 and the core network 710).

For example, if the PDN connection is indicated to the UE 704 as being offloadable, the UE 704 may initiate handover, or handoff, of the PDN connection from 3GPP to WLAN (e.g., from the first channel 703 to the second channel 705) such that traffic is offloaded to the WLAN 706 when a 3GPP signal quality falls below a predetermined threshold (e.g., the signal quality corresponding to the first channel 703 between the UE 704 and the eNB/base station 702 falls below a predetermined threshold), or when the WLAN 706 signal quality exceeds a predetermined threshold (e.g., the signal quality corresponding to the second channel 705 between the UE 704 and the WLAN 706 exceeds a predetermined threshold).

The UE 704 may receive the WLAN offloadability indication/indication information in one or more (evolved) session management ((E)SM) layer messages sent from the core network 710 (e.g., a message 711 sent from the MME 712 via the eNB/base station 702) to the UE 704. For example, for LTE, the WLAN offloadability indication information may be included in an Activate Default EPS Bearer Request, a Modify EPS bearer context request, an Activate Dedicated EPS bearer Context Request, and/or a Deactivate EPS Bearer Context Request. For UMTS, for example, the WLAN offloadability indication information may be included in an Activate PDP Context Accept, a Modify PDP Context Request, and/or a Modify PDP Context Accept. The WLAN offloadability indication information may be included in a message when the core network 710 wishes to indicate that the UE 704 is allowed to offload traffic using an established PDN connection via the WLAN 706. However if the MME 712 wishes to deactivate all EPS bearers of a PDN connection, the MME 712 need not include the WLAN offloadability indication information in the message. It should be noted that in other configurations, a serving GPRS support node (SGSN) may determine that all PDP contexts of a PDN connection should be deactivated, in which case the SGSN may send the message to the UE 704 without including the WLAN offloadability indication information in the message.

The WLAN offloadability indication information may be changed while the UE 704 is connected to the network 710. For example, the WLAN offloadability indication information may be changed from "offloadable" (e.g., offloadability of the UE 704 is authorized) to "not-offloadable" (e.g., offloadability of the UE 704 is unauthorized). However, some scenarios in which the WLAN offloadability indication information is changed may lead to problems for the UE 704.

For example, in a first scenario, the UE 704 initiates 791 handover of a PDN connection from 3GPP (e.g., from the eNB/base station 702) to WLAN 706. The UE 704 may initiate 791 the handover if the UE 704 detects 792 one or more corresponding appropriate triggers (e.g., triggers corresponding to a signal quality of the eNB/base station 702 and/or the WLAN 706 exceeding or falling below a predetermined threshold). The initiation 791 of the handover may entail initiating signaling procedures on the WLAN 706 side, such as WLAN authentication and PDN connection establishment. These signaling procedures may be initiated over WLAN 706 by the UE 704 using appropriate protocols, such as EAP for Single Connection Mode (SCM) and WLAN Control Plane Protocol (WLCP).

In the present scenario, while the handover signaling for the PDN connection is ongoing via WLAN 706, the 3GPP core network 710 may send to the UE 704 via the eNB/base station 702 a message 711 containing an updated WLAN offloadability indication information for the PDN connection, which sets the WLAN offloadability indication information value to "not offloadable." The update of the WLAN offloadability indication information value may be triggered by an updated indication provided by a subscriber database (e.g., a HSS 720) to the core network 710. Although the HSS 720 is shown as part of the core network 710, it should be noted that the HSS 720 could instead be separate from the core network 710.

Accordingly, by the UE 704 receiving the message 711 containing an updated WLAN offloadability indication information that indicates that the PDN connection with the UE 704 is no longer offloadable while the UE 704 already has an ongoing handover procedure in contravention to the received indication may cause the UE 704 to determine that an error exists. Although, in at least one configuration, the UE 704 may abort 793 the ongoing handover procedure, aborting 793 the procedure may be a waste of resources, and therefore may not always be the most desirable solution to address the present scenario.

That is, receiving a message 711 containing an updated WLAN offloadability indication information of "not-offloadable" at a time when the UE 704 is already in the midst of a handover process to switch from the eNB/base station 702 to the WLAN router 706 may lead to system errors and/or system inefficiencies. Accordingly, instead of aborting 793 the ongoing handover procedure, the UE 704 may handle the present scenario by simply ignoring/disregarding 794 the updated WLAN offloadability indication information.

Although the UE 704 disregards 794 the updated WLAN offloadability indication information of not-offloadable, the UE 704 may not successfully complete the handover process. According to different configurations, if the UE 704 fails to successfully complete the handover process, the UE 704 either may store the updated WLAN offloadability indication information in a UE 704 context database so that the UE 704 may make future handover decisions in accordance with the updated WLAN offloadability indication information, or may instead continue to disregard 794 the updated WLAN offloadability indication information and may continue 795 to attempt to successfully complete the handover process.

According to another configuration, a UE 704 may be connected to the core network 710 in 3GPP. A HSS 720 may send a message 714 to the core network 710 containing an updated WLAN offloadability indication information corresponding to a PDN connection between the UE 704 and the core network 710 (e.g., by sending a message 714 containing the updated WLAN offloadability indication information to the MME 712 of the core network 710). A protocol of the core network 710 may be to send the updated WLAN offloadability indication information to the UE 704 (e.g., in message 711) in a subsequently received session management (SM) message associated with the PDN connection to the UE 704.

However, if the subsequently received SM message (e.g., message 714) received by the core network 710 contains an instruction to deactivate a default bearer of the PDN connection, the UE 704 may not be able to effectively use the updated WLAN offloadability indication information. The issue may be further compounded if the deactivation of the default bearer is due to handover of the PDN connection to WLAN 706, while the updated WLAN offloadability indication information indicates that the PDN connection is not-offloadable.

Accordingly, in the present configuration, the core network 710 may determine 780 whether the subsequently received SM message 714 is a request to deactivate the EPS bearer (e.g., a "Deactivate EPS Bearer Request" message). If so, the core network 710 may further determine 780 whether the subsequently received SM message 714 is a request to deactivate the default bearer of the PDN connection with the UE 704. If the subsequently received SM message 714 is a request to deactivate the default EPS bearer of the PDN connection with the UE 704, the core network 710 may decide to disregard 781 the WLAN offloadability indication information, and may decide to send the message 711 to the UE 704 without the WLAN offloadability indication information included. However, if the SM message 714 is not a "Deactivate EPS Bearer Request" message requesting the deactivation of the default bearer of the PDN connection of the UE 704 (as opposed to some other dedicated bearer of the PDN connection of the UE 704), then the core network 710 may include the WLAN offloadability indication information in the SM message 711, and may send the SM message to the UE 704.

Additionally, when the MME 712 wants to deactivate all of the EPS bearers of a PDN connection to thereby disconnect the UE 704 from the PDN, the MME 712 may include the EPS bearer identity of the default bearer associated to the PDN in the "Deactivate EPS Bearer Request" message. In this scenario, the MME 712 need not include the WLAN offloadability indication information in the "Deactivate EPS Bearer Request" message, but if the UE 704 should receive the WLAN offloadability indication information, the UE 704 may disregard 794 the WLAN offloadability indication information. Optionally, the UE 704 may consider the "Deactivate EPS Bearer Request" message in conjunction with the WLAN offloadability indication information.

In an alternative configuration, the core network 710 may choose to include the WLAN offloadability indication information in the SM message 711 that is sent to the UE 704 regardless of the type of message, or request, the SM message 711 is. However, the UE 704 may decide whether or not to ignore 794, or disregard 794, the WLAN offloadability indication information in the SM message 711 depending on what type of message the SM message 711 is.

For example, the UE 704 may receive an SM message 711 from the core network 710 containing a WLAN offloadability indication information. The UE 704 may then determine 796 whether the SM message 711 corresponds to a request to deactivate the default EPS bearer of the PDN connection of the UE 704. If the UE 704 determines 796 that the SM message 711 contains a request to deactivate the default EPS bearer (i.e., a request to tear down the connection) and also determines 796 that the WLAN offloadability indication information indicates that the UE 704 is not authorized to be offloaded from the first channel 703 to the second channel 705, the UE 704 may decide to disregard 794 the WLAN offloadability indication information. That is, because the UE 704 is receiving a request from the core network 710 to end the UE's connection with the network 710, the UE 704 may disregard 794 the WLAN offloadability indication information that indicates that the UE 704 is not authorized to engage in a handover to the WLAN 706, so that the UE 704 can establish a connection with the WLAN 706 if the UE 704 receives the appropriate triggers to do so.

In another scenario of the present configuration, if the SM message 711 is a Deactivate EPS Bearer Request message associated with the default bearer, and if the SM message 711 includes a WLAN offloadability indication information that indicates that the UE 704 is authorized to be offloaded to the WLAN (e.g., the WLAN offloadability indication information has a value of offloadable), the UE 704 may treat the offloadable indication included in the Deactivate EPS Bearer Request message as a handover command to handover the PDN connection to WLAN 706. Thereafter, the UE 704 may engage in a handover procedure.

Figure 8:
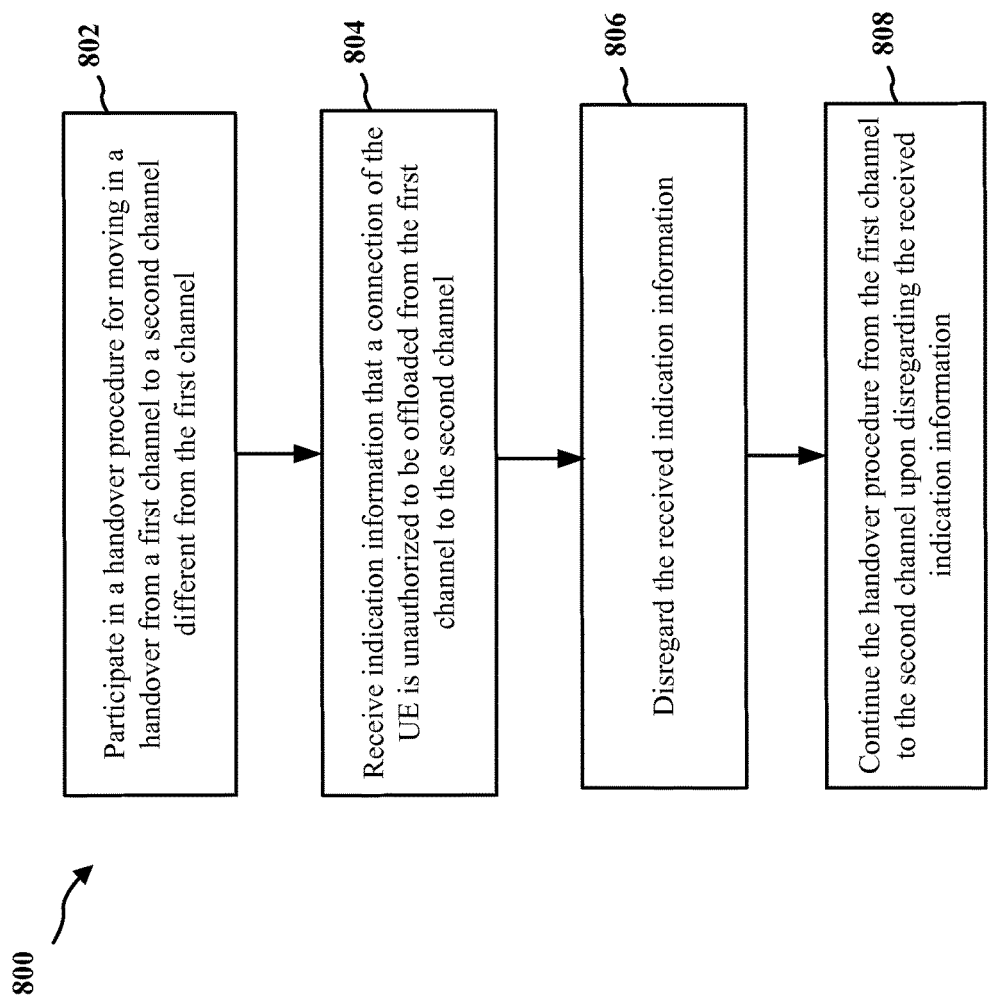
FIGS. 8-12 are flow charts of a methods of wireless communication.

FIG. 8 is a flow chart 800 of a method of wireless communication by a UE. The method may be performed by a UE, such as the UE 704 shown in FIG. 7. At 802, a handover procedure for switching a connection of the UE from a first channel to a second channel different from the first channel is ongoing. For example, referring to FIG. 7, the UE 704 may participate in a handover procedure for switching a connection of the UE from a first channel 703 to a second channel 705 different from the first channel 703. At 804, indication information that a connection of the UE is unauthorized to be offloaded from the first channel to the second channel may be received. For example, referring to FIG. 7, the UE 704 may receive (e.g., from the core network 710 via the eNB/base station 702) indication information that the UE 704 is unauthorized to be offloaded from the first channel 703 to the second channel 705. At 806, the received indication information may be disregarded. For example, referring to FIG. 7, the UE 704 may disregard 794 the received indication information. At 808, the handover procedure may be continued upon disregarding the received indication information. For example, referring to FIG. 7, the UE 704 may continue the handover procedure upon disregarding 794 the received indication information.

Figure 9:
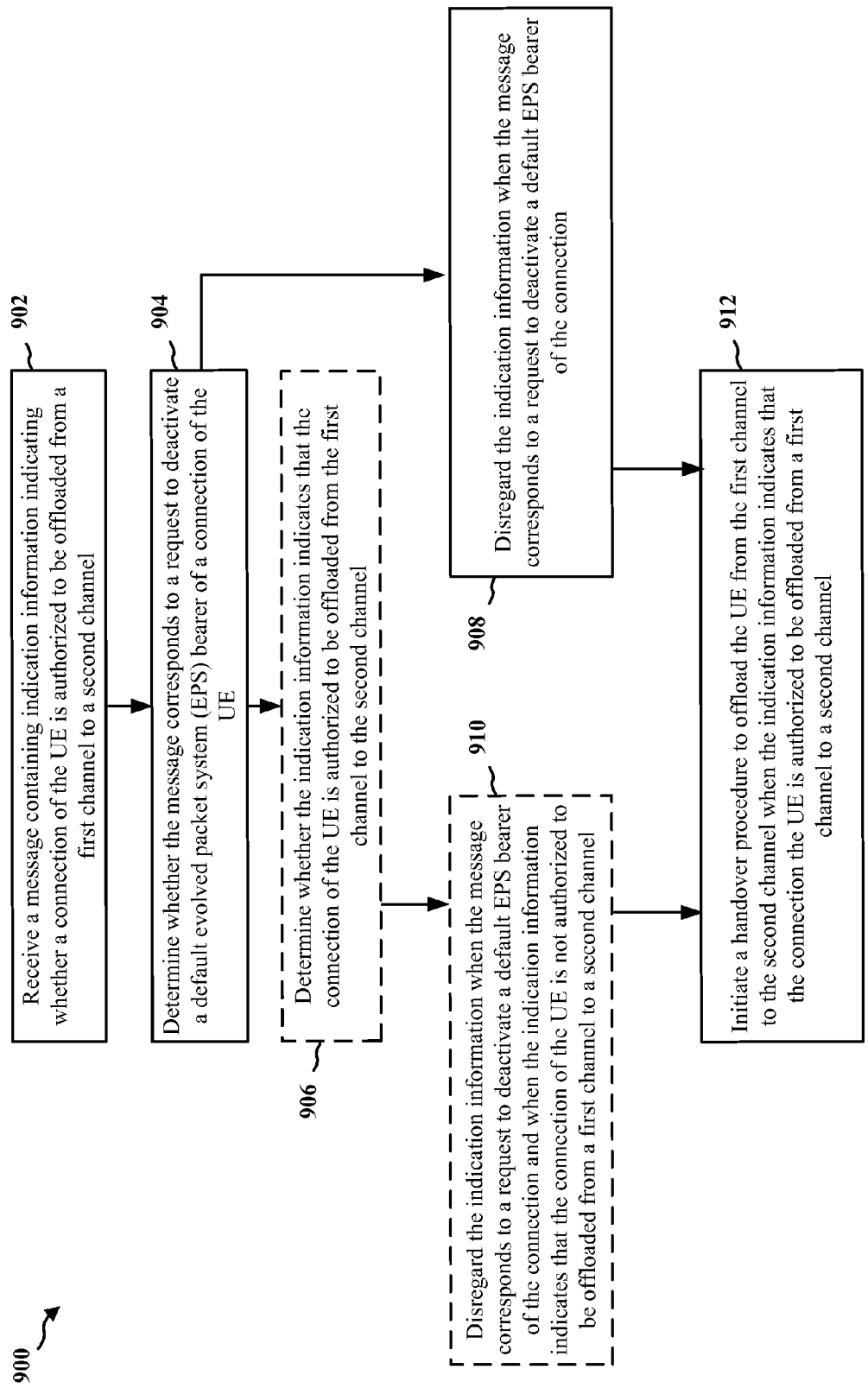

FIG. 9 is a flow chart 900 of a method of wireless communication by a UE. The method may be performed by a UE, such as the UE 704 shown in FIG. 7. At 902 a message (e.g., message 711) containing indication information (e.g., the WLAN offloadability indication information) indicating whether a connection of the UE (e.g., the UE 704) is authorized to be offloaded from a first channel (e.g., first channel 703) to a second channel (e.g., second channel 705) may be received (e.g., received by the UE 704). At 904, whether the message corresponds to a request to deactivate a default evolved packet system (EPS) bearer of the connection of the UE (e.g., the UE 704) may be determined (e.g., by the UE 704). Optionally, at 906, whether the indication information indicates that the connection of the UE (e.g., the UE 704) is authorized to be offloaded from the first channel (e.g., first channel 703) to the second channel (e.g., second channel 705) may be determined (e.g., determined 796 by the UE 704). At 908, the indication information may be disregarded when the message corresponds to a request to deactivate a default EPS bearer of the connection. Optionally, at 910, the indication information may be disregarded when the message corresponds to a request to deactivate a default EPS bearer of the connection and when the indication information indicates that the connection of the UE (e.g., the UE 704) is not authorized to be offloaded from a first channel (e.g., first channel 703) to a second channel (e.g., second channel 705). At 912, a handover procedure to offload the UE (e.g., the UE 704) from the first channel (e.g., first channel 703) to the second channel (e.g., second channel 705) may be initiated (e.g., initiated 791 by the UE 704) when the indication information indicates that the connection of the UE (e.g., the UE 704) is authorized to be offloaded from the first channel (e.g., first channel 703) to the second channel (e.g., second channel 705).

Figure 10:
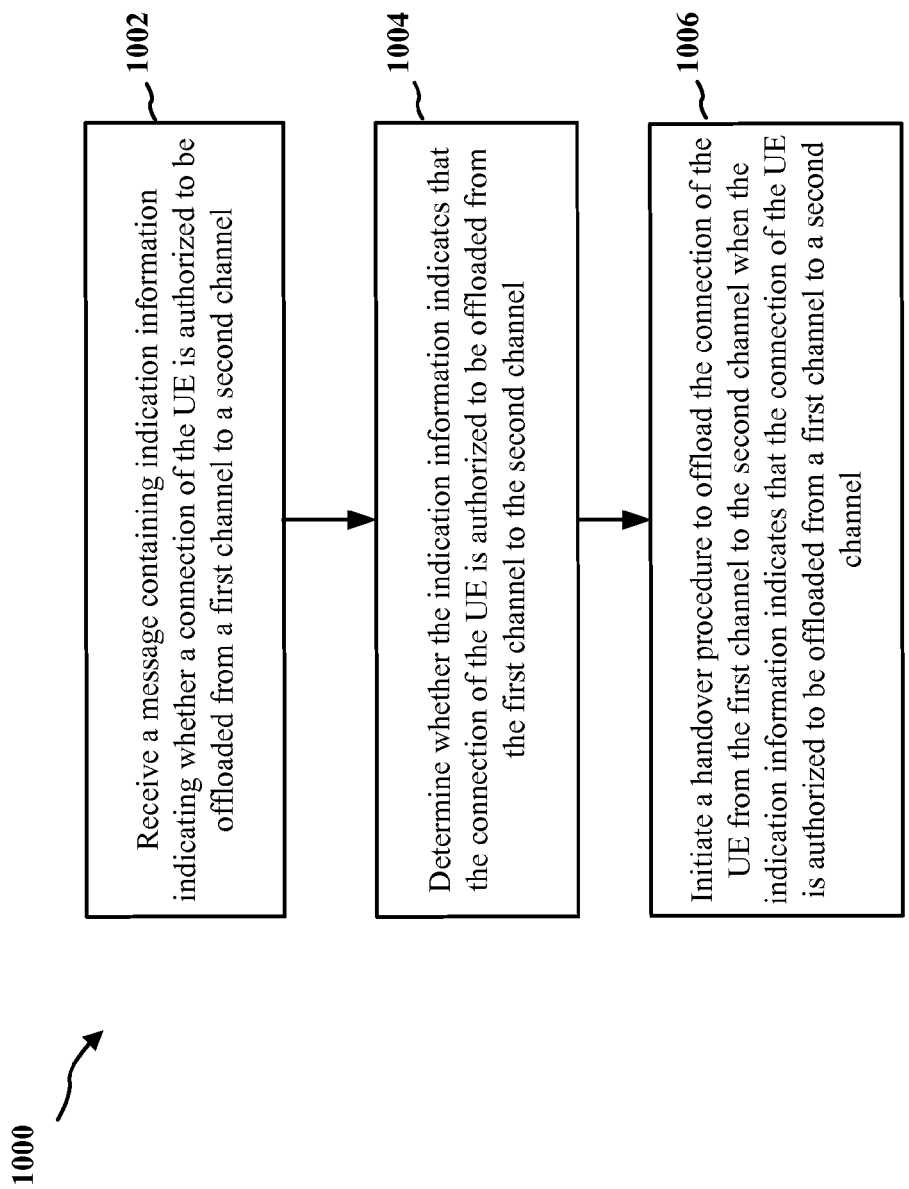

FIG. 10 is a flow chart 1000 of a method of wireless communication by a UE. The method may be performed by a UE, such as the UE 704 shown in FIG. 7. At 1002, a message (e.g., message 711) containing indication information (e.g., offloadability indication information) indicating whether a connection of the UE (e.g., the UE 704) is authorized to be offloaded from a first channel to a second channel (e.g., second channel 705) may be received (e.g., received by the UE 704). At 1004, whether the indication information indicates that the connection of the UE (e.g., the UE 704) is authorized to be offloaded from the first channel (e.g., first channel 703) to the second channel (e.g., second channel 705) may be determined (e.g., determined 796 by the UE 704). At 1006, a handover procedure to offload the connection of the UE (e.g., the UE 704) from the first channel to the second channel (e.g., second channel 705) when the indication information indicates that the connection of the UE (e.g., the UE 704) is authorized to be offloaded from a first channel (e.g., first channel 703) to a second channel (e.g., second channel 705) may be initiated (e.g., initiated 791 by the UE 704).

Figure 11:
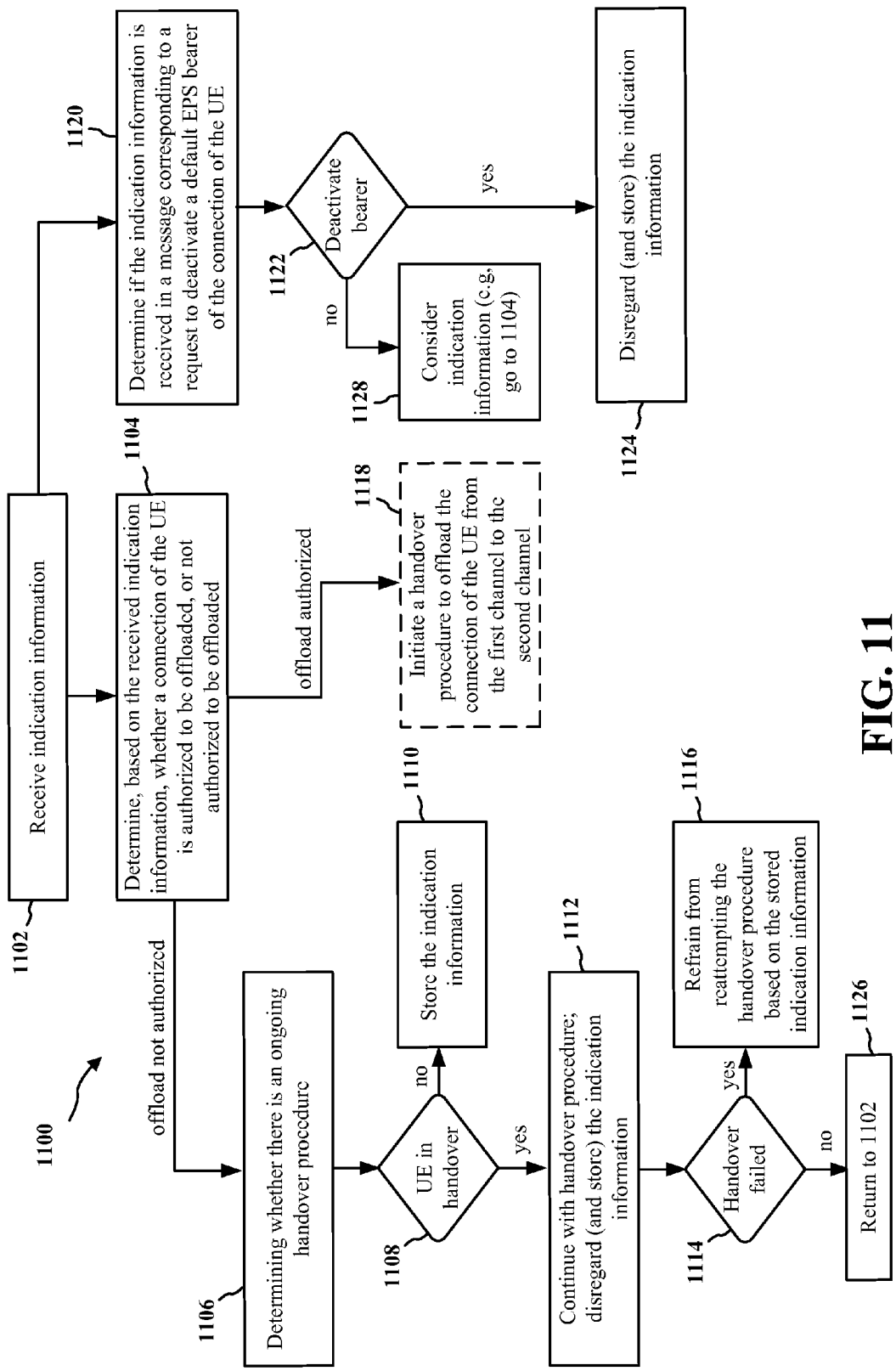

FIG. 11 is a flow chart 1100 of a method of wireless communication by a UE. The method may be performed by a UE, such as the UE 704 shown in FIG. 7. At 1102, the UE 704 receives indication information 711. At 1104, the UE 704 determines, based on the received indication information, whether a connection of the UE is authorized to be offloaded from a first channel 703 to a second channel 705, or not authorized to be offloaded from the first channel to the second channel. For example, the indication information may be included in a field in a message received by the UE and the UE may read the field to determine the connection is authorized or not authorized to be offloaded.

In one configuration, when the connection is determined by the UE 704 at 1104 to be not authorized to be offloaded, the UE at 1106, determines whether there is an ongoing handover procedure to offload the connection of the UE from the first channel 703 to the second channel 705. For example, the UE may have an ongoing signaling procedure associated with a handover, such as a (new) Attach procedure via WLAN while already attached to LTE. At 1108, if there is no ongoing handover procedure to offload the connection of the UE from the first channel 703 to the second channel 705, the UE, at 1110, stores the indication information in a memory. If, at 1108, there is an ongoing handover procedure to offload the connection of the UE from the first channel 703 to the second channel 705, the UE, at 1112, disregards the indication information, stores the indication information for future reference, and continues with the handover procedure. At 1114, the UE 705 determines if the handover procedure failed. For example, the UE may detect a WLAN failure through an ongoing signaling procedure, e.g., a (new) Attach procedure. Such WLAN failure may be due to authentication failure or lack of authorization to access the WLAN. At 1116, if the handover procedure did fail, the UE 704 refrains from reattempting the handover procedure based on the stored indication information. At 1126, if the handover procedure did not fail, the process returns to 1102, where the UE 704 may receive indication information.

In another optional configuration, when the connection is determined by the UE 704 at 1104 to be authorized to be offloaded from the first channel 703 to the second channel 705, the UE at 1118 may initiate a handover procedure to offload the connection of the UE from the first channel 703 to the second channel 705.

In another configuration, the UE, at 1120, determines whether the indication information is received in a session management message corresponding to a request to deactivate a default EPS bearer of the connection of the UE 704. For example, the UE may receive a Deactivate EPS Bearer Context Request message from the MME comprising the EPS bearer identity corresponding to the default bearer. At 1122, if the UE 704 determines that the message corresponds to a request to deactivate a default EPS bearer of the connection, the UE 704, at 1124, disregards the indication information. At 1122, if the UE 704 determines that the message does not correspond to a request to deactivate a default EPS bearer of the connection, the UE 704, at 1128, considers the indication information. Consideration of the indication information by the UE 704 may include determining, based on the received indication information, whether a connection of the UE is authorized to be offloaded, or not authorized to be offloaded (block 1104).

Figure 12:
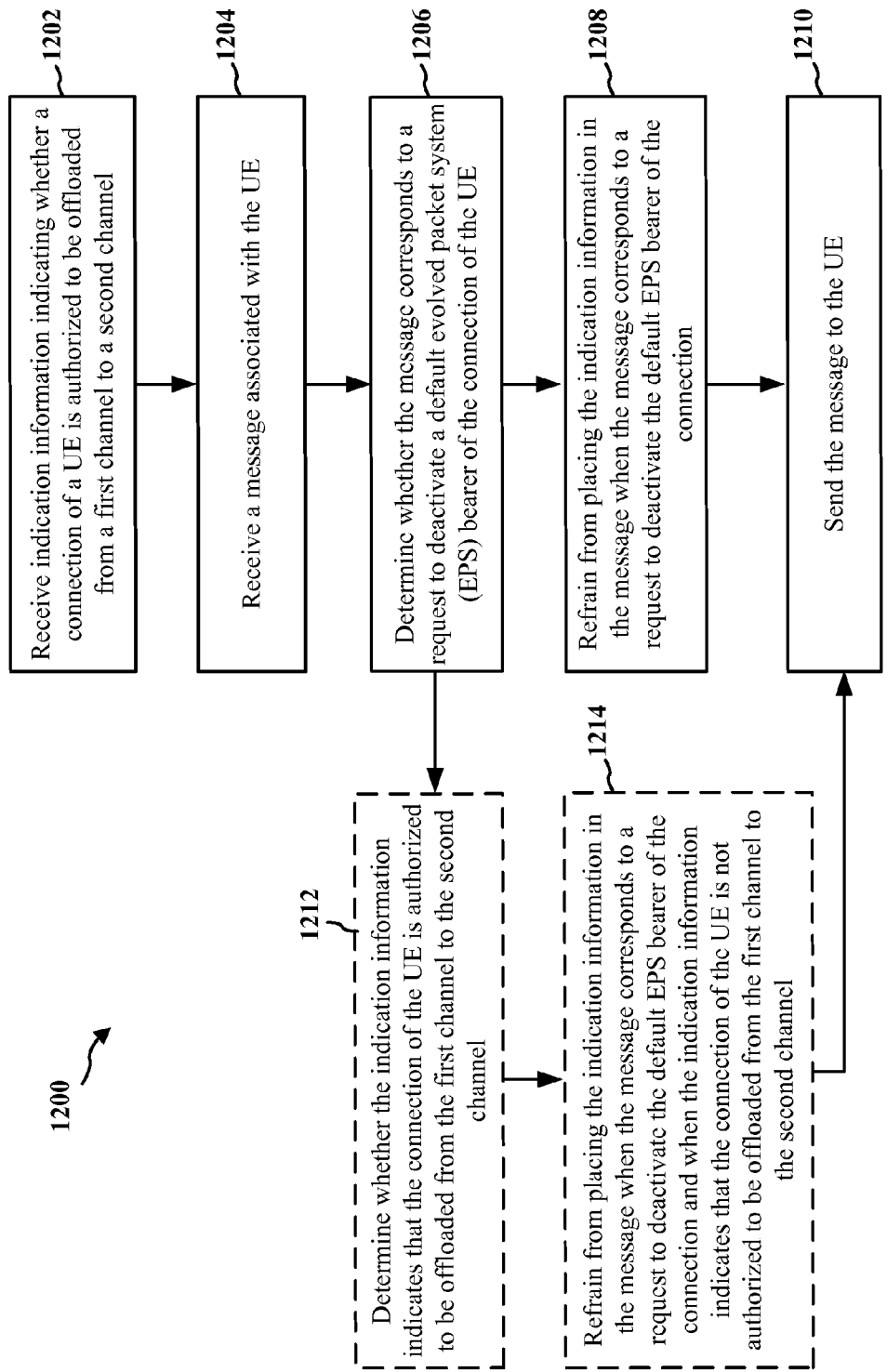

FIG. 12 is a flow chart 1200 of a method of wireless communication by a network entity. For example, the method may be performed by an MME 712 connected to the eNB/base station 702 shown in FIG. 7. At 1202, indication information indicating whether a connection of a UE is authorized to be offloaded from a first channel to a second channel may be received. For example, referring to FIG. 7, indication information indicating whether a connection of the UE 704 is authorized to be offloaded from the first channel 703 to the second channel 705 may be received. At 1204, a message (e.g., message 714) associated with the UE (e.g., UE 704) may be received. At 1206, a determination of whether the message corresponds to a request to deactivate a default evolved packet system (EPS) bearer of the connection of the UE (e.g., UE 704) may be determined (e.g., by the MME 712 or the core network 710). In one implementation, at 1208, the MME 712 may refrain from placing the indication information (e.g., WLAN offloadability indication information) in the message 714 when the message 714 corresponds to a request to deactivate the default EPS bearer of the connection. In another implementation, the MME 712 may at 1212, determine whether the indication information indicates that the connection of the UE is authorized to be offloaded from the first channel to the second channel, and then at 1214, refrain from placing the indication information in the message when the message corresponds to a request to deactivate the default EPS bearer of the connection and when the indication information indicates that the connection of the UE is not authorized to be offloaded from the first channel to the second channel. In either implementation, at 1210, the message (e.g., message 711) may be sent to the UE (e.g., UE 704).

Figure 13:
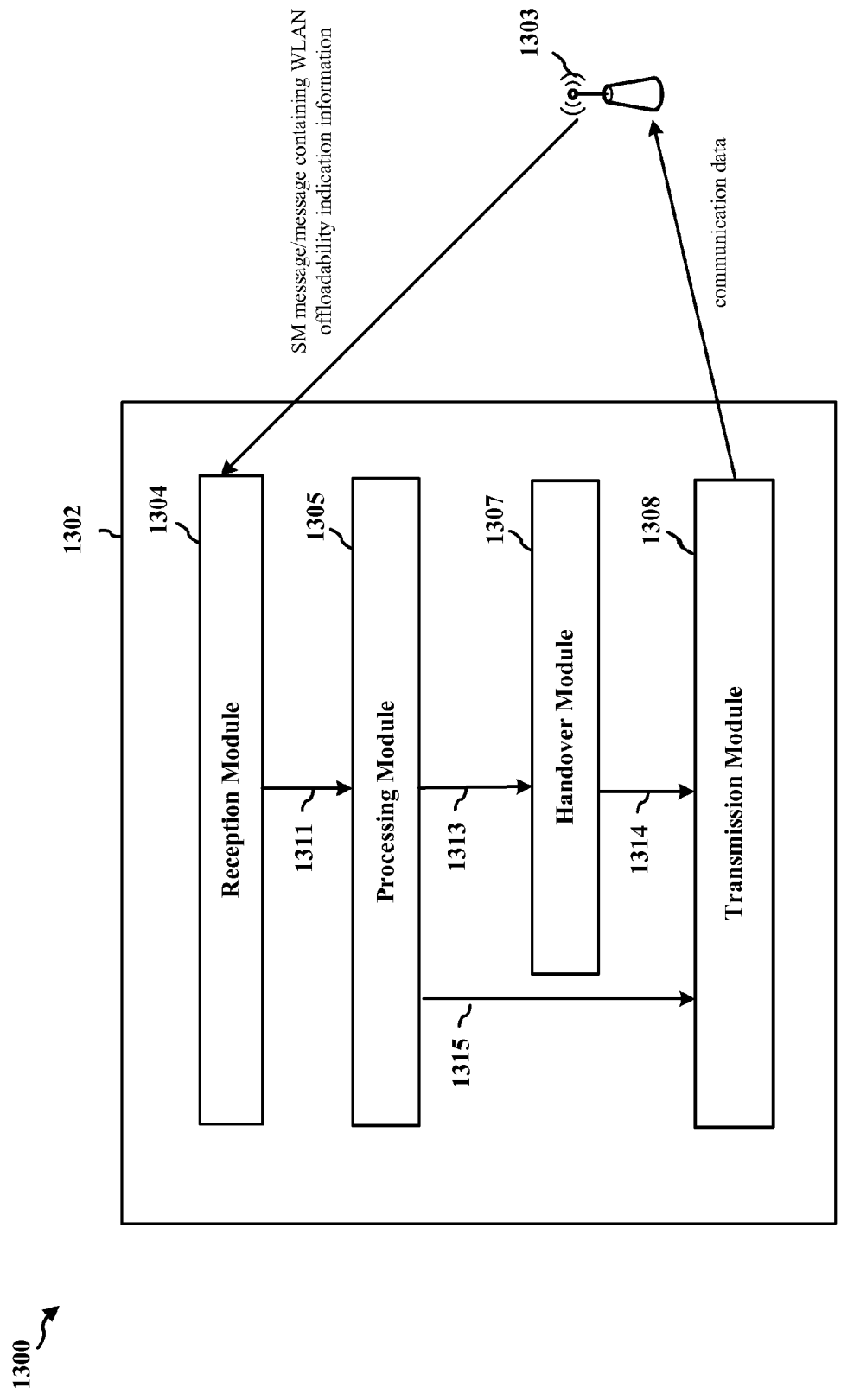
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302 configured to implement the methods of FIGS. 8, 9, 10, and 11. The apparatus 1302 may be a UE, such as UE 704 shown in FIG. 7.

In one configuration based on the methods of FIGS. 8, 9, and 10, the UE 1302 includes a reception module 1304 that is configured to receive indication information (e.g., from the core network 710 and/or from an eNB 1303) that the connection of the UE 1302 is unauthorized to be offloaded from the first channel (e.g., first channel 703) to the second channel (e.g., second channel 705). The UE 1302 includes a processing module 1305 in communication with the reception module 1304 that is configured to disregard the indication information included in message information 1311. The UE 1302 further includes a handover module 1307 in communication with the processing module 1305 that is configured to implement a handover procedure for switching a connection of the UE 1302 from the first channel to the second channel different from the first channel upon receiving handover initiation information 1313.

According to another exemplary embodiment, the reception module 1304 is configured to receive a message (e.g., message 711 from the core network 710, such as via eNB/base station 1303) containing indication information indicating whether a connection of the UE 1302 is authorized to be offloaded from a first channel to a second channel (e.g., from first channel 703 to second channel 705), while the processing module 1305 is configured to determine whether the message corresponds to a request to deactivate a default evolved packet system (EPS) bearer of the connection of the UE 1302, to determine whether the indication information indicates that the connection of the UE 1302 is authorized to be offloaded from the first channel to the second channel, and to disregard the indication information when the message corresponds to a request to deactivate a default EPS bearer of the connection and when the indication information indicates that the connection of the UE 1302 is not authorized to be offloaded from a first channel to a second channel.

According to another exemplary embodiment, the reception module 1304 is configured to receive a message containing indication information indicating whether a connection of the UE 1302 is authorized to be offloaded from a first channel to a second channel (e.g., first channel 703 to second channel 705), and the processing module 1305, upon receiving message information 1311, is configured to determine whether the indication information indicates that the connection of the UE 1302 is authorized to be offloaded from the first channel to the second channel, and the handover module 1307 is configured to initiate a handover procedure to offload the connection of the UE 1302 from the first channel to the second channel when the indication information indicates that the connection of the UE 1302 is authorized to be offloaded from a first channel to a second channel.

The UE 1302 further includes a transmission module 1308 that communicates with the handover module 1307 and that communicates with the processing module 1305. The transmission module 1308 may send messages to the core network 710 (e.g., messages to facilitate or continue a handover process upon receiving information 1314 and/or 1315 from the handover module 1307 and/or the processing module 1305, which may be sent to the core network 710 via the eNB/base station 1303).

In another configuration based on the methods of FIG. 11, the UE 1302 includes a reception module 1304 that is configured to receive indication information (e.g., from the core network 710 and/or from an eNB 1303). The UE 1302 includes a processing module 1305 in communication with the reception module 1304 that is configured to determine, based on the received indication information, whether a connection of the UE 1302 is authorized to be offloaded from a first channel to a second channel (e.g., first channel 703 to second channel 705), or not authorized to be offloaded from the first channel to the second channel.

In one exemplary implementation, the processing module 1305 may be further configured to determine, when the connection is not authorized to be offloaded, whether there is an ongoing handover procedure to offload the connection of the UE from the first channel to the second channel. The processing module 1305 is also configured to disregard the indication information when the connection is not authorized to be offloaded and it is determined that there is an ongoing handover procedure to offload the connection of the UE from the first channel to the second channel.

In another exemplary implementation, the processing module 1305 may be configured to initiate, when the connection of the UE is authorized to be offloaded from the first channel to the second channel, a handover procedure to offload the connection of the UE from the first channel to the second channel. The UE 1302 includes a handover module 1307 in communication with the processing module 1305 that is configured to execute a handover procedure upon receiving handover initiation information 1313 from the processing module 1305. In another configuration, the handover module 1307 is configured to continue with a handover procedure if there is an ongoing handover procedure.

In yet another exemplary implementation, the processing module 1305 may be further configure to determine whether the indication information is received in a session management message corresponding to a request to deactivate a default EPS bearer of the connection of the UE, and to disregard the indication information when the connection is not authorized to be offloaded and it is determined that the message corresponds to a request to deactivate a default EPS bearer of the connection.

The UE 1302 further includes a transmission module 1308 that communicates with the handover module 1307 and that communicates with the processing module 1305. The transmission module 1308 may send messages to the core network 710 (e.g., messages to facilitate or continue a handover process upon receiving information 1314 and/or 1315 from the handover module 1307 and/or the processing module 1305, which may be sent to the core network 710 via the eNB/base station 1303).

The apparatus 1302 may include additional modules that perform each of the blocks of the algorithms respectively in the aforementioned flow charts of FIGS. 8, 10, and 11. As such, each block in the aforementioned flow charts of FIGS. 8, 10, and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
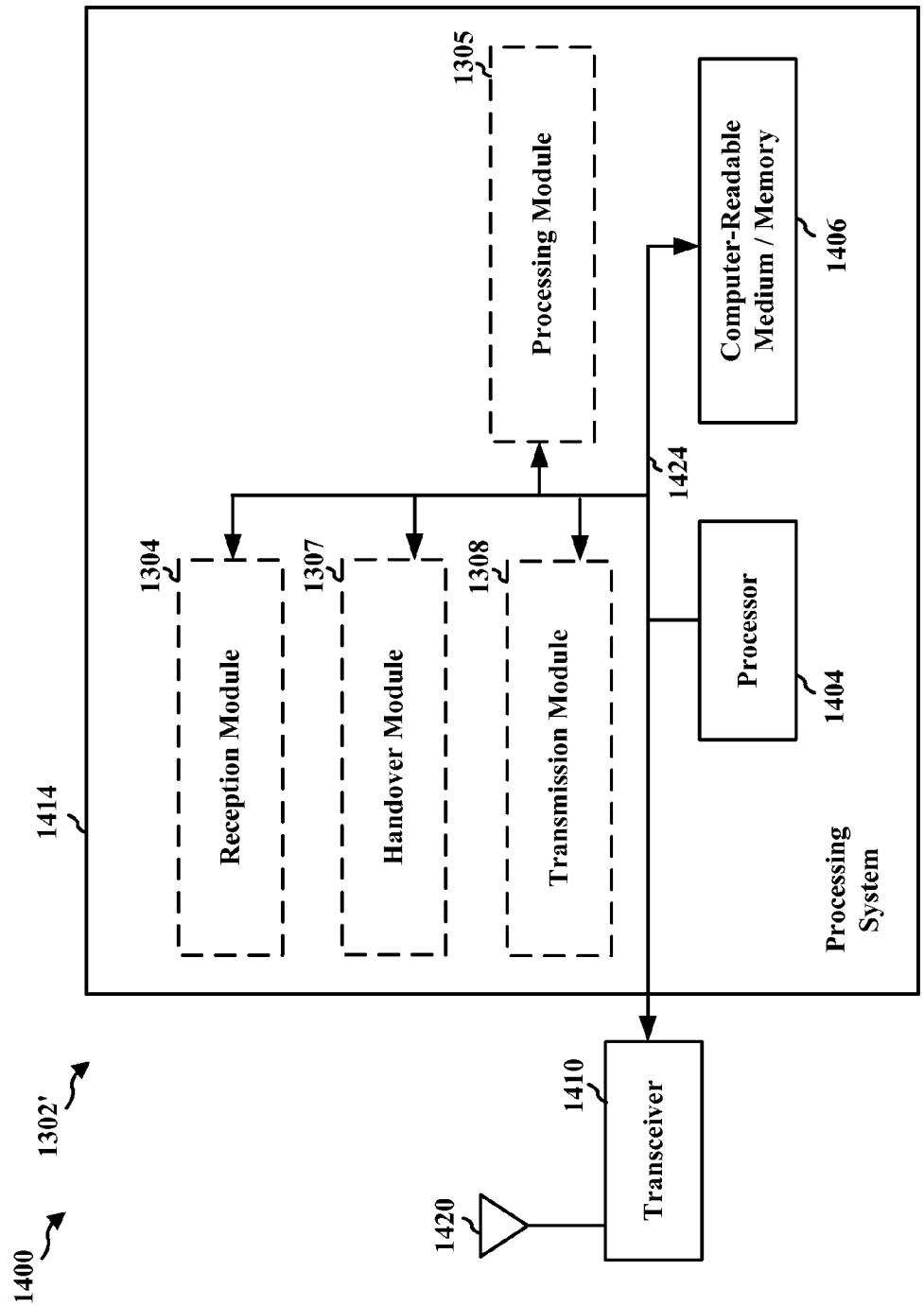
FIG. 14 is a diagram illustrating an example of a hardware implementation for a UE employing a processing system.

FIG. 14 is a diagram 1400 illustrating an example of a hardware implementation for a UE 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1305, 1307, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least the handover module 1307, and the processing module 1305. The modules may be software modules running in the processor 1404, resident/stored in the computer-readable medium/memory 1406, one or more hardware modules coupled to the processor 1404, or some combination thereof. The processing system 1414 may be a component of the UE 1302, and may include the memory 660 and/or at least one of the TX processor 668, the RX processor 656, and the controller/processor 659.

In one configuration based on the methods of FIGS. 8, 9, and 10, the UE 1302/1302' for wireless communication is a UE that includes means for implementing a handover procedure (e.g., handover module 1307) for switching a connection of the UE 1302/1302' from a first channel (e.g., first channel 703) to a second channel (e.g., second channel 705) different from the first channel. The UE 1302/1302' further includes means for receiving (e.g., reception module 1304) indication information that the connection of the UE 1302/1302' is unauthorized to be offloaded from the first channel to the second channel. The UE 1302/1302' further includes means for disregarding (e.g., processing module 1305) the received indication information. The UE 1302/1302' further includes means for continuing the handover procedure (e.g., the handover module 1307) upon disregarding the received indication information.

In another exemplary aspect, the UE 1302/1302' includes means for receiving (e.g., reception module 1304) a message containing indication information indicating whether a connection of the UE 1302/1302' is authorized to be offloaded from a first channel to a second channel, further includes means for determining (e.g., processing module 1305) whether the message corresponds to a request to deactivate a default evolved packet system (EPS) bearer of the connection of the UE, further includes means for determining (e.g., the processing module 1305) whether the indication information indicates that the connection of the UE 1302/1302' is authorized to be offloaded from the first channel to the second channel, and further includes means for disregarding (e.g., processing module 1305) the indication information when the message corresponds to a request to deactivate a default EPS bearer of the connection and when the indication information indicates that the connection of the UE 1302/1302' is not authorized to be offloaded from a first channel to a second channel.

In another exemplary aspect, the UE 1302/1302' include means for receiving (e.g., reception module 1304) a message containing indication information indicating whether a connection of the UE 1302/1302' is authorized to be offloaded from a first channel to a second channel, further includes means for determining (e.g., processing module 1305) whether the indication information indicates that the connection of the UE 1302/1302' is authorized to be offloaded from the first channel to the second channel, and further includes means for initiating a handover procedure (e.g., handover module 1307) to offload the connection of the UE 1302/1302' from the first channel to the second channel when the indication information indicates that the connection of the UE 1302/1302' is authorized to be offloaded from a first channel to a second channel.

The aforementioned means may be one or more of the aforementioned modules of the UE 1302 and/or the processing system 1414 of the UE 1302' configured to perform the functions recited by the aforementioned means and described with respect to the methods of FIGS. 8, 9, and 10. As described supra, the processing system 1414 may include the TX processor 668, the RX processor 656, and the controller/processor 659. As such, in one configuration, the aforementioned means may be the TX processor 668, the RX processor 656, and the controller/processor 659 configured to perform the functions recited by the aforementioned means.

In another configuration based on the methods of FIG. 11, the UE 1302/1302' for wireless communication may be a UE that includes means for receiving indication information. The means for receiving may correspond to the reception module 1304. The UE also includes means for determining, based on the received indication information, whether a connection of the UE is authorized to be offloaded from a first channel to a second channel, or not authorized to be offloaded from the first channel to the second channel. This means for determining offload authorization may correspond to the processing module 1305.

In one exemplary implementation, the UE 1302/1302' may also include means for determining, when the connection is not authorized to be offloaded, whether there is an ongoing handover procedure to offload the connection of the UE from the first channel to the second channel; means for disregarding the indication information when the connection is not authorized to be offloaded and it is determined that there is an ongoing handover procedure to offload the connection of the UE from the first channel to the second channel. The UE may also include means for continuing the handover procedure when it is determined that there is an ongoing handover procedure to offload the connection of the UE from the first channel to the second channel; and means for, when there is an ongoing handover procedure to offload the connection of the UE from the first channel to the second channel: determining if the handover procedure failed; and refraining from reattempting the handover procedure based on the indication information when it is determined that the handover procedure failed. These foregoing means may correspond to the processing module 1305.

In one exemplary implementation, the UE 1302/1302' may also include means for initiating, when the connection of the UE is authorized to be offloaded from the first channel to the second channel, a handover procedure to offload the connection of the UE from the first channel to the second channel. This means may correspond to the processing module 1305.

In another exemplary implementation, the UE 1302/1302' may include means for determining whether the indication information is received in a session management message corresponding to a request to deactivate a default EPS bearer of the connection of the UE; and means for disregarding the indication information when the connection is not authorized to be offloaded and it is determined that the message corresponds to a request to deactivate a default EPS bearer of the connection. These foregoing means may correspond to the processing module 1305.

The aforementioned means may be one or more of the aforementioned modules of the UE 1302 and/or the processing system 1414 of the UE 1302' configured to perform the functions recited by the aforementioned means and described with respect to the methods of FIG. 11. As described supra, the processing system 1414 may include the TX processor 668, the RX processor 656, and the controller/processor 659. As such, in one configuration, the aforementioned means may be the TX processor 668, the RX processor 656, and the controller/processor 659 configured to perform the functions recited by the aforementioned means.

Figure 15:
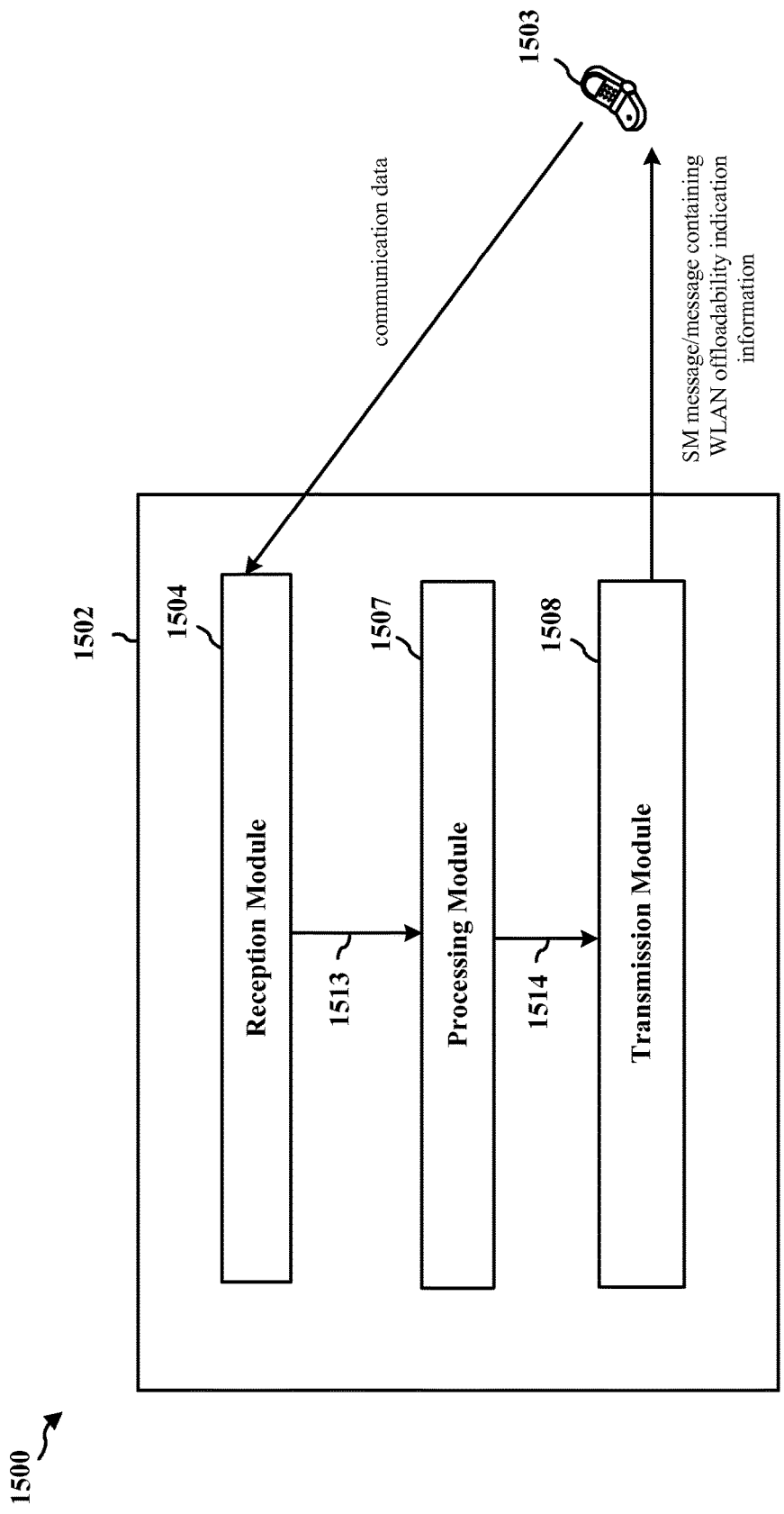
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus 1502 may be an MME, such as MME 712 shown in FIG. 7, and may be part of a core network, such as the core network 710 shown in FIG. 7. The MME 1502 includes a reception module 1504 that is configured to receive indication information (e.g., from an HSS 720 of the core network 710) indicating whether a connection of a UE (e.g., UE 1503 or UE 704) is authorized to be offloaded from a first channel (e.g., first channel 703) to a second channel (e.g., second channel 705), and to receive a message associated with the UE 1503/704.

The MME 1502 further includes a processing module 1507 in communication with the reception module 1504 (e.g., to receive message information 1513 from the reception module 1504). The processing module 1507 is configured to determine whether the message corresponds to a request to deactivate a default evolved packet system (EPS) bearer of the connection of the UE 1503, and to cause the MME 1502 to refrain from placing the indication information in the message when the message corresponds to a request to deactivate the default EPS bearer of the connection.

The MME 1502 further includes a transmission module 1508 that is in communication with the processing module 1507 and that is configured to send the message to the UE 1503 (e.g., upon receiving message information 1514 from the processing module 1507).

The apparatus 1502 may include additional modules that perform each of the blocks of the algorithms respectively in the aforementioned flow charts of FIG. 9. As such, each block in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
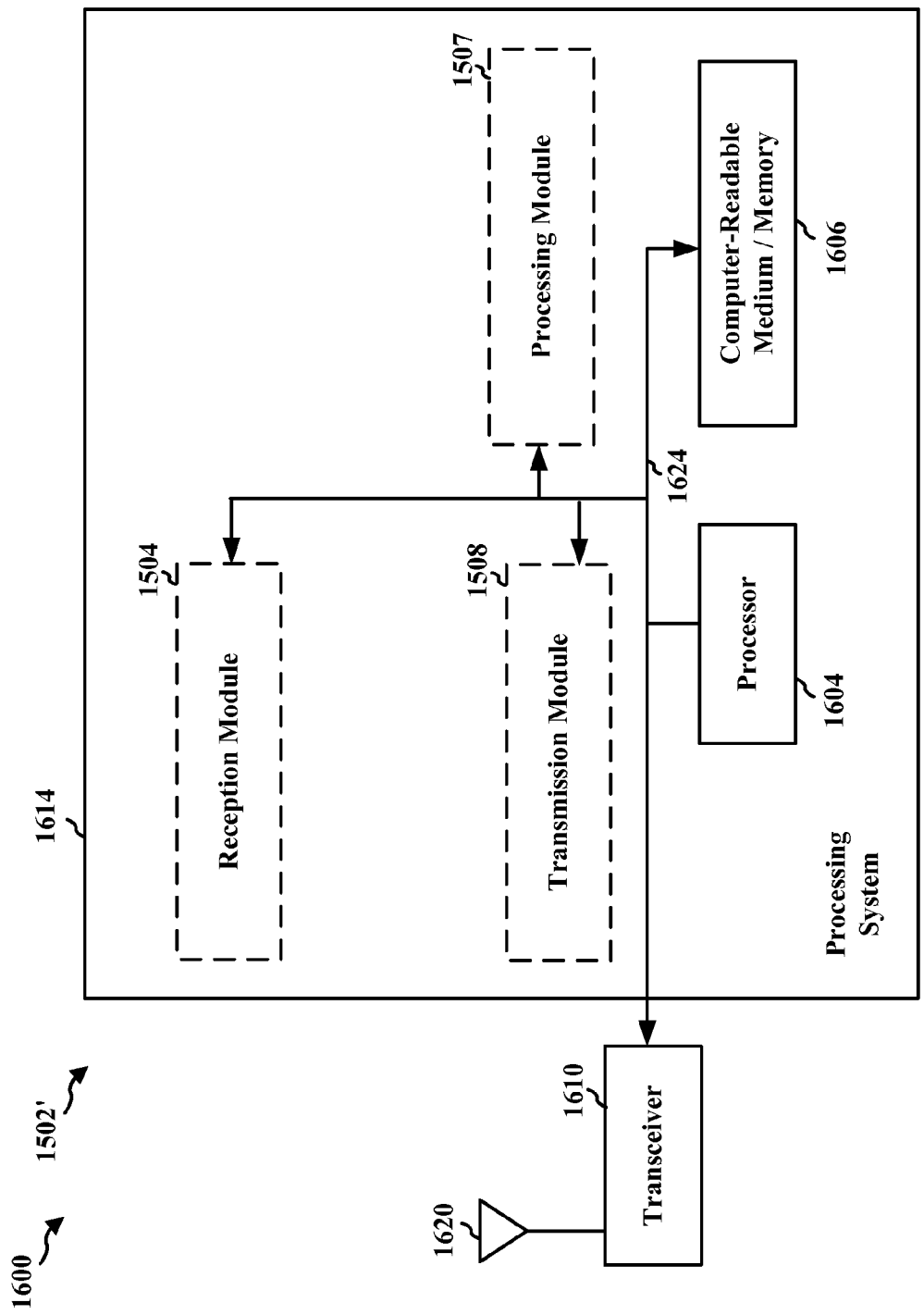
FIG. 16 is a diagram illustrating an example of a hardware implementation for an apparatus employing a processing system.

FIG. 16 is a diagram 1600 illustrating an example of a hardware implementation for an apparatus 1602' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1507, 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception module 1504. In addition, the transceiver 1610 receives information from the processing system 1614, specifically the transmission module 1508, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1507, and 1508. The modules may be software modules running in the processor 1604, resident/stored in the computer readable-medium/memory 1606, one or more hardware modules coupled to the processor 1604, or some combination thereof. The processing system 1614 may be a component of the eNB 610 and may include the memory 676 and/or at least one of the TX processor 616, the RX processor 670, and the controller/processor 675.

In one configuration, the apparatus 1502/1502' for wireless communication includes means for receiving (e.g., reception module 1504) indication information indicating whether a connection of a UE 1503 is authorized to be offloaded from a first channel (e.g., first channel 703) to a second channel (e.g., second channel 705). The apparatus 1502/1502' further includes means for receiving (e.g., reception module 1504) a message associated with the UE. The apparatus 1502/1502' further includes means for determining (e.g., processing module 1507) whether the message corresponds to a request to deactivate a default evolved packet system (EPS) bearer of the connection of the UE. The apparatus 1502/1502' further includes means for refraining (e.g., processing module 1507) from placing the indication information in the message when the message corresponds to a request to deactivate the default EPS bearer of the connection. The apparatus 1502/1502' further includes means for sending the message (e.g., transmission module 1508) to the UE. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of wireless communication by a user equipment (UE), comprising:
   receiving an indication information;
   determining, based on the indication information, whether a connection of the UE is authorized to be offloaded from a first channel to a second channel, or not authorized to be offloaded from the first channel to the second channel;

determining whether there is an ongoing handover procedure to offload the connection of the UE from the first channel to the second channel; and disregarding the indication information when the connection is not authorized to be offloaded and there is an ongoing handover procedure to offload the connection of the UE from the first channel to the second channel.

2. The method of claim 1, further comprising continuing the handover procedure when there is an ongoing handover procedure to offload the connection of the UE from the first channel to the second channel.

3. The method of claim 1, wherein disregarding the indication information comprises storing the indication information.

4. The method of claim 3, wherein the indication information is stored in a UE context database.

5. The method of claim 1, further comprising, when there is an ongoing handover procedure to offload the connection of the UE from the first channel to the second channel:

determining whether the handover procedure has failed; and refraining from reattempting the handover procedure based on the indication information when the handover procedure failed.

6. The method of claim 1, wherein the first channel is associated with a first radio access technology (RAT), and the second channel is associated with a second RAT different from the first RAT.

7. The method of claim 6, wherein the first RAT comprises LTE or UTRA, and wherein the second RAT comprises a wide local area network (WLAN).

8. A user equipment (UE) for wireless communication, comprising:

means for receiving an indication information;

means for determining, based on the indication information, whether a connection of the UE is authorized to be offloaded from a first channel to a second channel, or not authorized to be offloaded from the first channel to the second channel;

means for determining whether there is an ongoing handover procedure to offload the connection of the UE from the first channel to the second channel; and means for disregarding the indication information when the connection is not authorized to be offloaded and there is an ongoing handover procedure to offload the connection of the UE from the first channel to the second channel.

9. The UE of claim 8, further comprising means for continuing the handover procedure when there is an ongoing handover procedure to offload the connection of the UE from the first channel to the second channel.

10. The UE of claim 8, wherein the means for disregarding the indication information is configured to store the indication information.

11. The UE of claim 10, wherein the indication information is stored in a UE context database.

12. The UE of claim 8, further comprising, means for, when there is an ongoing handover procedure to offload the connection of the UE from the first channel to the second channel:

determining whether the handover procedure has failed; and refraining from reattempting the handover procedure based on the indication information when the handover procedure failed.

13. The UE of claim 8, wherein the first channel is associated with a first radio access technology (RAT), and the second channel is associated with a second RAT different from the first RAT.

14. The UE of claim 13, wherein the first RAT comprises LTE or UTRA, and wherein the second RAT comprises a wide local area network (WLAN).

15. A user equipment (UE) for wireless communication, comprising:

a memory; and at least one processor coupled to the memory and configured to:

receive an indication information;

determine, based on the indication information, whether a connection of the UE is authorized to be offloaded from a first channel to a second channel, or not authorized to be offloaded from the first channel to the second channel;

determine whether there is an ongoing handover procedure to offload the connection of the UE from the first channel to the second channel; and disregard the indication information when the connection is not authorized to be offloaded and there is an ongoing handover procedure to offload the connection of the UE from the first channel to the second channel.

16. The UE of claim 15, wherein the at least one processor is further configured to continue the handover procedure when there is an ongoing handover procedure to offload the connection of the UE from the first channel to the second channel.

17. The UE of claim 15, wherein the at least one processor is configured to disregard the indication information by being further configured to store the indication information.

18. The UE of claim 17, wherein the indication information is stored in a UE context database.

19. The UE of claim 15, wherein the at least one processor is further configured to, when there is an ongoing handover procedure to offload the connection of the UE from the first channel to the second channel:

determining whether the handover procedure has failed; and refrain from reattempting the handover procedure based on the indication information when the handover procedure failed.

20. The UE of claim 15, wherein the first channel is associated with a first radio access technology (RAT), and the second channel is associated with a second RAT different from the first RAT.

21. The UE of claim 20, wherein the first RAT comprises LTE or UTRA, and wherein the second RAT comprises a wide local area network (WLAN).

22. A non-transitory computer-readable medium storing computer executable code for wireless communication by a user equipment (UE), comprising code for:

receiving an indication information;

determining, based on the indication information, whether a connection of the UE is authorized to be offloaded from a first channel to a second channel, or not authorized to be offloaded from the first channel to the second channel;

determining whether there is an ongoing handover procedure to offload the connection of the UE from the first channel to the second channel; and disregarding the indication information when the connection is not authorized to be offloaded and there is an ongoing handover procedure to offload the connection of the UE from the first channel to the second channel.

23. A method of wireless communication by a user equipment (UE), comprising:
receiving an indication information indicating whether a connection of the UE is authorized to be offloaded from a first channel to a second channel;
determining whether the indication information is received in a message corresponding to a request to deactivate a default evolved packet system (EPS) bearer of the connection of the UE; and
disregarding the indication information when the message corresponds to a request to deactivate a default EPS bearer of the connection.

24. The method of claim 23, further comprising determining, based on the indication information, whether the connection of the UE is authorized to be offloaded from the first channel to the second channel, or not authorized to be offloaded from the first channel to the second channel, and wherein disregarding the indication information comprises disregarding the indication information when the message corresponds to a request to deactivate a default EPS bearer of the connection and the connection is not authorized to be offloaded.

25. The method of claim 23, wherein disregarding the indication information comprises storing the indication information.

26. The method of claim 25, wherein the indication information is stored in a UE context database.

27. The method of claim 23, wherein the first channel is associated with a first radio access technology (RAT), and the second channel is associated with a second RAT different from the first RAT.

28. The method of claim 27 wherein the first RAT comprises LTE or UTRA, and wherein the second RAT comprises a wide local area network (WLAN).

29. A user equipment (UE), comprising:
means for receiving an indication information indicating whether a connection of the UE is authorized to be offloaded from a first channel to a second channel;
means for determining whether the indication information is received in a message corresponding to a request to deactivate a default evolved packet system (EPS) bearer of the connection of the UE; and
means for disregarding the indication information when the message corresponds to a request to deactivate a default EPS bearer of the connection.

30. A user equipment (UE) for wireless communication, comprising:
a memory; and
at least one processor coupled to the memory and configured to:
receive an indication information indicating whether a connection of the UE is authorized to be offloaded from a first channel to a second channel;
determine whether the indication information is received in a message corresponding to a request to deactivate a default evolved packet system (EPS) bearer of the connection of the UE; and
disregard the indication information when the message corresponds to a request to deactivate a default EPS bearer of the connection.

31. A non-transitory computer-readable medium storing computer executable code for wireless communication by a user equipment (UE), comprising code for:

receiving an indication information indicating whether a connection of the UE is authorized to be offloaded from a first channel to a second channel;
determining whether the indication information is received in a message corresponding to a request to deactivate a default evolved packet system (EPS) bearer of the connection of the UE; and
disregarding the indication information when the message corresponds to a request to deactivate a default EPS bearer of the connection.

32. A method of wireless communication by a mobility management entity (MME), the method comprising:
receiving an indication information indicating whether a connection of a UE is authorized to be offloaded from a first channel to a second channel;
receiving a message associated with the UE;
determining whether the message corresponds to a request to deactivate a default evolved packet system (EPS) bearer of the connection of the UE;
refraining from placing the indication information in the message when the message corresponds to a request to deactivate a default EPS bearer of the connection; and
sending the message to the UE.

33. The method of claim 32, further comprising:
determining whether the indication information indicates that the connection of the UE is authorized to be offloaded from the first channel to the second channel; and
wherein refraining from placing the indication information in the message comprises refraining from placing the indication information in the message when the message corresponds to a request to deactivate the default EPS bearer of the connection and the indication information indicates that the connection of the UE is not authorized to be offloaded from the first channel to the second channel.

34. A mobility management entity (MME), comprising:
means for receiving an indication information indicating whether a connection of a UE is authorized to be offloaded from a first channel to a second channel;
means for receiving a message associated with the UE;
means for determining whether the message corresponds to a request to deactivate a default evolved packet system (EPS) bearer of the connection of the UE;
means for refraining from placing the indication information in the message when the message corresponds to a request to deactivate a default EPS bearer of the connection; and
means for sending the message to the UE.

35. The MME of claim 34, further comprising:
means for determining whether the indication information indicates that the connection of the UE is authorized to be offloaded from the first channel to the second channel; and
wherein the means for refraining from placing the indication information in the message is configured to refrain from placing the indication information in the message when the message corresponds to a request to deactivate the default EPS bearer of the connection and the indication information indicates that the connection of the UE is not authorized to be offloaded from the first channel to the second channel.

36. An apparatus for wireless communication, comprising:
a memory; and
at least one processor coupled to the memory and configured to:

receive an indication information indicating whether a connection of a UE is authorized to be offloaded from a first channel to a second channel;

receive a message associated with the UE;

determine whether the message corresponds to a request to deactivate a default evolved packet system (EPS) bearer of the connection of the UE;

refrain from placing the indication information in the message when the message corresponds to a request to deactivate a default EPS bearer of the connection; and send the message to the UE.

37. The apparatus of claim 36, wherein the at least one processor is further configured to:

determine whether the indication information indicates that the connection of the UE is authorized to be offloaded from the first channel to the second channel; and refrain from placing the indication information in the message when the message corresponds to a request to deactivate the default EPS bearer of the connection and the indication information indicates that the connection of the UE is not authorized to be offloaded from the first channel to the second channel.

38. A non-transitory computer-readable medium storing computer executable code for wireless communication, comprising code for:

receiving an indication information indicating whether a connection of a UE is authorized to be offloaded from a first channel to a second channel;

receiving a message associated with the UE;

determining whether the message corresponds to a request to deactivate a default evolved packet system (EPS) bearer of the connection of the UE;

refraining from placing the indication information in the message when the message corresponds to a request to deactivate a default EPS bearer of the connection; and sending the message to the UE.

\* \* \* \* \*